United States Patent
Blagg et al.

(10) Patent No.: US 8,015,085 B2
(45) Date of Patent: Sep. 6, 2011

(54) SYSTEM FOR DISTRIBUTING FUNDS

(75) Inventors: Lynn Blagg, Omaha, NE (US); Michael F. Rodin, Greenwood Village, CO (US)

(73) Assignees: First Data Corporation, Greenwood Village, CO (US); The Western Union Company, Englewood, CO (US)

( * ) Notice: Subject to any disclaimer, the term of this patent is extended or adjusted under 35 U.S.C. 154(b) by 1350 days.

(21) Appl. No.: 10/987,031

(22) Filed: Nov. 11, 2004

(65) Prior Publication Data
US 2005/0177496 A1    Aug. 11, 2005

Related U.S. Application Data

(60) Provisional application No. 60/520,488, filed on Nov. 14, 2003.

(51) Int. Cl.
*G06Q 40/00* (2006.01)
(52) U.S. Cl. .......................................................... 705/35
(58) Field of Classification Search ...................... 705/35
See application file for complete search history.

(56) References Cited

U.S. PATENT DOCUMENTS

| | | | |
|---|---|---|---|
| 4,256,955 A | 3/1981 | Giraud et al. |
| 4,321,672 A | 3/1982 | Braun et al. |
| 4,679,191 A | 7/1987 | Nelson et al. |
| 4,700,055 A | 10/1987 | Kashkashian, Jr. |
| 4,816,653 A | 3/1989 | Anderl et al. |
| 4,837,422 A | 6/1989 | Dethloff et al. |
| 4,900,903 A | 2/1990 | Wright et al. |
| 4,918,602 A | 4/1990 | Bone et al. |
| 5,025,372 A | 6/1991 | Burton et al. |
| 5,121,945 A | 6/1992 | Thomson et al. |
| 5,155,342 A | 10/1992 | Urano |
| 5,191,522 A | 3/1993 | Bosco et al. |
| 5,231,569 A | 7/1993 | Myatt et al. |
| 5,339,392 A | 8/1994 | Risberg et al. |
| 5,410,684 A | 4/1995 | Ainsworth et al. |
| 5,457,305 A | 10/1995 | Akel et al. |

(Continued)

FOREIGN PATENT DOCUMENTS
EP       0540234 A2    5/1993

(Continued)

OTHER PUBLICATIONS

Doug Payne: "Tracking mising child support Many resources: In chasing deadbeat parents, this office has tools denied even to police", The Atlanta Journal the atlanta constitution. Atlanta, Ga.: Jan. 7, 1999. p. JG.05.*

(Continued)

*Primary Examiner* — Hani Kazimi
*Assistant Examiner* — Hatem Ali
(74) *Attorney, Agent, or Firm* — Kilpatrick Townsend & Stockton LLP

(57) ABSTRACT

A system is described allowing the transfer of funds, for example, from an employer to a third-party intermediary which can distribute the funds via a payroll card to an employee. The system allows a portion of the population such as that which does not use traditional bank accounts to receive funds via a payroll card at a variety of locations without the necessity of visiting the bank location of the employer to cash a check. Other embodiments of the invention allow funds to be distributed from a first party to a second party via an intermediary party.

18 Claims, 17 Drawing Sheets

U.S. PATENT DOCUMENTS

| | | |
|---|---|---|
| 5,465,206 A | 11/1995 | Hilt et al. |
| 5,475,585 A | 12/1995 | Bush |
| 5,483,444 A | 1/1996 | Heintzman et al. |
| 5,483,445 A | 1/1996 | Pickering |
| 5,485,370 A | 1/1996 | Moss et al. |
| 5,500,513 A | 3/1996 | Langhans et al. |
| 5,513,102 A | 4/1996 | Auriemma |
| 5,530,232 A | 6/1996 | Taylor |
| 5,537,314 A | 7/1996 | Kanter |
| 5,546,523 A | 8/1996 | Gatto |
| 5,560,005 A | 9/1996 | Hoover |
| 5,590,038 A | 12/1996 | Pirtoda |
| 5,613,012 A | 3/1997 | Hoffman et al. |
| 5,614,703 A | 3/1997 | Martin et al. |
| 5,621,640 A | 4/1997 | Burke |
| 5,644,727 A | 7/1997 | Atkins |
| 5,648,906 A | 7/1997 | Amirpanahi |
| 5,649,117 A | 7/1997 | Landry |
| 5,649,118 A | 7/1997 | Carlisle et al. |
| 5,650,604 A | 7/1997 | Marcous et al. |
| 5,684,965 A | 11/1997 | Pickering |
| 5,770,843 A | 6/1998 | Rose et al. |
| 5,774,870 A | 6/1998 | Storey |
| 5,783,808 A | 7/1998 | Josephson |
| 5,802,511 A | 9/1998 | Kouchi et al. |
| 5,826,243 A | 10/1998 | Musmanno et al. |
| 5,852,811 A | 12/1998 | Atikins |
| 5,859,419 A | 1/1999 | Wynn |
| 5,864,830 A | 1/1999 | Armetta et al. |
| 5,873,072 A | 2/1999 | Kight et al. |
| 5,875,437 A | 2/1999 | Atkins |
| 5,897,625 A | 4/1999 | Gustin et al. |
| 5,903,830 A | 5/1999 | Joao et al. |
| 5,914,472 A | 6/1999 | Foladare et al. |
| 5,920,847 A | 7/1999 | Kolling et al. |
| 5,937,391 A | 8/1999 | Ikeda et al. |
| 5,940,811 A | 8/1999 | Norris |
| 5,943,656 A | 8/1999 | Crooks et al. |
| 5,953,710 A | 9/1999 | Fleming |
| 5,970,480 A | 10/1999 | Kalina |
| 5,978,780 A | 11/1999 | Watson |
| 5,984,180 A | 11/1999 | Albrecht |
| 5,991,736 A | 11/1999 | Ferguson et al. |
| 5,999,596 A | 12/1999 | Walker et al. |
| 5,999,624 A | 12/1999 | Hopkins |
| 6,009,415 A | 12/1999 | Shurling et al. |
| 6,012,048 A | 1/2000 | Gustin et al. |
| 6,018,718 A | 1/2000 | Walker et al. |
| 6,021,397 A | 2/2000 | Jones et al. |
| 6,021,943 A | 2/2000 | Chastain |
| 6,035,285 A | 3/2000 | Schlect et al. |
| 6,044,360 A | 3/2000 | Picciallo |
| 6,049,782 A | 4/2000 | Gottesman et al. |
| 6,061,660 A | 5/2000 | Eggleston et al. |
| 6,081,790 A | 6/2000 | Rosen |
| 6,092,055 A | 7/2000 | Owens et al. |
| 6,105,008 A | 8/2000 | Davis et al. |
| 6,108,641 A | 8/2000 | Kenna et al. |
| 6,119,109 A | 9/2000 | Muratani et al. |
| 6,128,599 A | 10/2000 | Walker et al. |
| 6,128,602 A | 10/2000 | Northington et al. |
| 6,128,603 A | 10/2000 | Dent et al. |
| 6,131,810 A | 10/2000 | Weiss et al. |
| 6,138,107 A | 10/2000 | Elgamal |
| 6,226,364 B1 | 5/2001 | O'Neil |
| 6,226,623 B1 | 5/2001 | Schein et al. |
| 6,260,024 B1 | 7/2001 | Shkedy |
| 6,273,816 B1 | 8/2001 | Bansal et al. |
| 6,292,789 B1 | 9/2001 | Schutzer |
| 6,304,860 B1 | 10/2001 | Martin, Jr. et al. |
| 6,311,170 B1 | 10/2001 | Embrey |
| 6,324,524 B1 | 11/2001 | Lent et al. |
| 6,327,573 B1 | 12/2001 | Walker et al. |
| 6,327,577 B1 | 12/2001 | Garrison et al. |
| 6,332,126 B1 | 12/2001 | Peirce et al. |
| 6,379,247 B1 | 4/2002 | Walker et al. |
| 6,405,181 B2 | 6/2002 | Lent et al. |
| 6,422,462 B1 | 7/2002 | Cohen |
| 6,549,912 B1 | 4/2003 | Chen |
| 6,607,136 B1 | 8/2003 | Atsmon et al. |
| 6,623,415 B2 | 9/2003 | Gates et al. |
| 6,636,833 B1 | 10/2003 | Flitcroft et al. |
| 6,661,217 B2 | 12/2003 | Kimball et al. |
| 6,764,013 B2 * | 7/2004 | Ben-Aissa ............... 235/472.01 |
| 6,779,319 B2 | 8/2004 | Smith et al. |
| 6,802,500 B2 | 10/2004 | Bennett et al. |
| 6,829,588 B1 | 12/2004 | Stoutenburg et al. |
| 6,865,547 B1 | 3/2005 | Brake et al. |
| 6,925,441 B1 | 8/2005 | Jones et al. |
| 7,050,996 B1 | 5/2006 | Holm-Blagg et al. |
| 7,076,465 B1 | 7/2006 | Holm-Blagg et al. |
| 7,225,155 B1 * | 5/2007 | Polk .......................... 705/40 |
| 7,340,423 B1 | 3/2008 | Blagg et al. |
| 2001/0018679 A1 | 8/2001 | Lee |
| 2001/0032192 A1 | 10/2001 | Putta et al. |
| 2001/0034720 A1 | 10/2001 | Armes |
| 2001/0042785 A1 | 11/2001 | Walker et al. |
| 2001/0051923 A1 | 12/2001 | Kosuda |
| 2002/0069122 A1 | 6/2002 | Yun et al. |
| 2002/0103746 A1 | 8/2002 | Moffett et al. |
| 2002/0123376 A1 | 9/2002 | Walker et al. |
| 2002/0123962 A1 | 9/2002 | Bryman et al. |
| 2002/0138424 A1 | 9/2002 | Coyle |
| 2002/0156723 A1 | 10/2002 | Lilly et al. |
| 2002/0198806 A1 | 12/2002 | Holm-Blagg et al. |
| 2003/0028491 A1* | 2/2003 | Cooper ........................ 705/64 |
| 2003/0074311 A1* | 4/2003 | Saylors et al. ................ 705/39 |
| 2003/0080185 A1* | 5/2003 | Werther ...................... 235/380 |
| 2003/0083933 A1 | 5/2003 | McAlear |
| 2003/0115160 A1 | 6/2003 | Nowlin et al. |
| 2003/0120571 A1 | 6/2003 | Holm-Blagg |
| 2003/0135438 A1 | 7/2003 | Holm-Blagg et al. |
| 2003/0149660 A1* | 8/2003 | Canfield ........................ 705/39 |
| 2003/0171992 A1 | 9/2003 | Holm-Blagg et al. |
| 2003/0182218 A1 | 9/2003 | Holm-Blagg |
| 2003/0212620 A1 | 11/2003 | Holm-Blagg |
| 2004/0030657 A1 | 2/2004 | Holm-Blagg et al. |
| 2004/0117302 A1 | 6/2004 | Weichert et al. |
| 2004/0148239 A1 | 7/2004 | Albee et al. |
| 2004/0158532 A1 | 8/2004 | Breck et al. |
| 2005/0154664 A1 | 7/2005 | Guy et al. |
| 2006/0212389 A2 * | 9/2006 | Bent et al. ...................... 705/40 |

FOREIGN PATENT DOCUMENTS

| | | |
|---|---|---|
| EP | 0725376 | 8/1996 |
| WO | WO 97-43893 | 11/1997 |
| WO | WO 01-57709 | 8/2001 |

OTHER PUBLICATIONS

Susan Wilschke: "Improving child support enforcement for children receving SSI", Social security Bulletin. Washington: 2001/2002. vol. 64, Iss. 1; p. 16, 11 pgs.*

Jessica Pearsn, Esther Ann Griswold: "Child support policies and domestic violence", Public Welfare. Washington: Winter 1997. vol. 55, Iss. 1; p. 26, 7 pgs.*

U.S. Appl. No. 09/298,417, Office Action dated Mar. 27, 2002, 7 pages.

U.S. Appl. No. 09/298,417, Office Action dated Dec. 27, 2002, 8 pages.

U.S. Appl. No. 09/298,417, Office Action dated Jun. 9, 2003, 8 pages.

U.S. Appl. No. 09/298,417, Office Action dated Nov. 5, 2003, 7 pages.

U.S. Appl. No. 09/298,417, Notice of Appeal dated Jun. 27, 2003, 4 pages.

U.S. Appl. No. 09/298,417, Appeal Brief dated Jul. 1, 2003, 19 pages.

U.S. Appl. No. 09/298,417, Appeal Brief dated Feb. 5, 2004, 16 pages.

U.S. Appl. No. 09/298,505, Final Office Action dated Oct. 19, 2004, 5 pages.

U.S. Appl. No. 09/298,505, Final Office Action dated Jan. 23, 2002, 11 pages.

U.S. Appl. No. 09/298,505, Office Action dated May 22, 2001, 7 pages.

U.S. Appl. No. 11/187,605, Advisory Action dated Oct. 18, 2007, 3 pages.
U.S. Appl. No. 11/187,605, Office Action dated Aug. 2, 2007, 16 pages.
U.S. Appl. No. 11/187,605, Office Action dated Mar. 13, 2007, 15 pages.
U.S. Appl. No. 11/187,605, Final Office Action dated Nov. 30, 2006, 8 pages.
U.S. Appl. No. 11/187,605, Office Action dated Jun. 16, 2006, 5 pages.
U.S. Appl. No. 10/025,092, Final Office Action dated Oct. 18, 2007, 8 pages.
U.S. Appl. No. 10/025,092, Office Action dated May 4, 2007, 8 pages.
U.S. Appl. No. 10/371,852, Office Action dated Aug. 10, 2007, 7 pages.
U.S. Appl. No. 10/319,422, Advisory Action dated Nov. 30, 2007, 3 pages.
U.S. Appl. No. 10/319,422, Final Office Action dated Aug. 22, 2007, 11 pages.
U.S. Appl. No. 10/319,422, Office Action dated Mar. 8, 2007, 11 pages.
U.S. Appl. No. 10/373,637, Office Action dated Aug. 15, 2007, 23 pages.
U.S. Appl. No. 11/191,444, Office Action dated Oct. 18, 2007, 6 pages.
U.S. Appl. No. 11/191,444, Office Action dated Dec. 28, 2006, 8 pages.
U.S. Appl. No. 09/298,521, Ex Parte Quayle Action dated Jul. 25, 2007, 7 pages.
U.S. Appl. No. 09/298,521, Office Action dated Jun. 5, 2007, 6 pages.
U.S. Appl. No. 09/298,521, Appeal Brief dated Feb. 3, 2004, 25 pages.
U.S. Appl. No. 09/298,521, Office Action dated Nov. 3, 2003, 9 pages.
U.S. Appl. No. 09/298,521, Appeal Brief dated Jun. 25, 2003, 10 pages.
U.S. Appl. No. 09/298,521, Appeal Brief dated Aug. 15, 2002, 23 pages.
U.S. Appl. No. 09/298,521, Final Office Action dated Jul. 26, 2002, 7 pages.
U.S. Appl. No. 09/298,521, Office Action dated Nov. 27, 2001, 7 pages.
U.S. Appl. No. 09/298,521, Office Action dated May 30, 2001, 7 pages.
U.S. Appl. No. 10/205,482, Office Action dated Jul. 6, 2007, 13 pages.
U.S. Appl. No. 10/172,378, Final Office Action dated Nov. 9, 2007, 11 pages.
U.S. Appl. No. 10/172,378, Office Action dated Jun. 13, 2007, 11 pages.
U.S. Appl. No. 10/237,572, Examiner's Answer to Appeal Brief dated Aug. 10, 2007, 18 pages.
U.S. Appl. No. 10/237,572, Appeal Brief dated Jan. 2, 2007, 24 pages.
U.S. Appl. No. 10/237,572, Appeal Brief on Nov. 15, 2006, 24 pages.
U.S. Appl. No. 10/237,572, Office Action dated Aug. 15, 2006, 14 pages.
U.S. Appl. No. 10/237,572, Appeal Brief on Nov. 29, 2005, 22 pages.
U.S. Appl. No. 10/237,572, Appeal Brief dated Aug. 19, 2005, 20 pages.
U.S. Appl. No. 10/237,572, Appeal Brief dated Feb. 4, 2005, 19 pages.
U.S. Appl. No. 10/237,572, Advisory Action dated Nov. 30, 2004, 2 pages.
U.S. Appl. No. 10/237,572, Final Office Action dated Sep. 8, 2004, 18 pages.
U.S. Appl. No. 10/237,572, Office Action dated Mar. 25, 2004, 14 pages.
U.S. Appl. No. 10/672,596, Office Action dated Jul. 5, 2007, 8 pages.
Air Miles Reward Program; "Terms and conditions of the Air Miles Reward Program"; May 1998.
White, Ron "How Computers Work", 3rd Edition, Que Corporation, Sep. 1998.
Svaldi, Aldo "Debitlike card assists access to child-support aid." Denver Post. Denver, CO: Feb. 11, 2003, p. C.01 (3pages).
"Modular ATM Gives Boost to Diebold", Akron Beacon Journal, Jul. 12, 1997.
"Virginia Bank to Gain Accounts though Pact with Debit Card Issuer", American Banker v164n93p7, May 17, 1999.
Western Union—First Data Corp. "Trans$Pay . . . soon to be the Western Union Ppay Card".
Western Union—First Data Corp. "FDX-400 Remote Payroll Distribution".
U.S. Appl. No. 11/187,605, Office Action dated Jan. 8, 2008, 17 pages.
U.S. Appl. No. 10/025,092, Advisory Action dated Dec. 26, 2007 3 pages.
U.S. Appl. No. 10/319,422, Office Action dated Mar. 3, 2008, 12 pages.
U.S. Appl. No. 10/373,637, Final Office Action dated Jan. 11, 2008, 24 pages.
U.S. Appl. No. 10/205,482, Final Office Action dated Jan. 16, 2008, 13 pages.
U.S. Appl. No. 10/172,378, Office Action dated Feb. 12, 2008, 11 pages.
U.S. Appl. No. 10/672,596, Final Office Action dated Dec. 31, 2007, 12 pages.
U.S. Appl. No. 10/386,027, Office Action dated Feb. 14, 2008, 11 pages.
U.S. Appl. No. 10/025,092, Office Action dated Apr. 3, 2008, 18 pages.
U.S. Appl. No. 10/371,852, Final Office Action dated May 1, 2008, 18 pages.
U.S. Appl. No. 10/373,637, Advisory Action dated Apr. 1, 2008, 3 pages.
U.S. Appl. No. 11/191,444, Final Office Action dated Apr. 25, 2008, 13 pages.
U.S. Appl. No. 09/298,521, Notice of Allowance dated Oct. 3, 2007, 10 pages.
U.S. Appl. No. 11/533,041, Office Action dated Apr. 10, 2008, 23 pages.

* cited by examiner

SYSTEM FOR DISTRIBUTING FUNDS

CROSS-REFERENCES TO RELATED APPLICATIONS

This application claims the benefit under 35 USC §119(e) of U.S. Provisional Patent Application No. 60/520,488, filed Nov. 14, 2003 entitled "System for Accounting" and this application is also related to U.S. Provisional Patent Application No. 60/520,432, filed Nov. 14, 2003, entitled "Bulk Card Ordering System and Methods"; U.S. Provisional Patent Application No. 60/520,486, filed Nov. 14, 2003, entitled "Stored Value Lottery Card and Methods"; U.S. patent application Ser. No. 10/714,437, filed Nov. 14, 2003, entitled "Open Loop Stored Value System"; U.S. patent application Ser. No. 10/714,441, filed Nov. 14, 2003, entitled "Open Loop Stored Value Account Configuration", which are hereby incorporated by reference in their entirety for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

Some embodiments of the invention relate generally to payroll disposition schemes. More specifically, some embodiments relate to allotting payroll funds to individuals through the use of various instruments, such as stored value cards.

BACKGROUND

There is a large segment of the population that does not use traditional bank accounts. Therefore, when they are issued paychecks, they must go to the bank that issued the paycheck in order to receive the entire amount of the check in cash. Alternatively, checks can be cashed for a significant fee at various third-party outlets. As a result, there is a disadvantage to these un-banked individuals in that they must travel to banks where they do not hold an account. Or, they have to pay a significant fee if a third-party outlet is used to cash a check. Also, they receive the entire amount of the check and must carry it on their person rather than being able to keep it safe in an account.

As is readily apparent, those without a bank account are severely disadvantaged in that they do not have a convenient mechanism for accessing a portion of their payroll funds between pay cycles. Rather, they must retrieve all their cash and store it in their homes or on their person. This poses a risk in that the money could be lost or stolen. Furthermore, the ready access to a large amount of cash does not encourage saving.

This segment of society that does not have bank accounts is further disadvantaged in receiving alimony or child custody finds. In some circumstances, wages are garnished from a noncustodial parent's paycheck and transferred to a custodial parent. This can easily be accomplished when the custodial parent has a bank account. However, if the custodial parent does not have a bank account, then the transfer of finds to the custodial parent can be difficult.

Thus, this segment of society would benefit from a system that permits it to easily receive payments that would traditionally be deposited in a bank account. Furthermore, as this segment of society is often limited in their ability to travel to a check-cashing bank, they would benefit from a system that would make funds available at a wide variety of locations.

SUMMARY

According to one embodiment of the invention, a method of distributing funds owed by an employer to an employee can be accomplished by determining payroll funds owed to the employee by the employer; distributing the payroll finds to an account controlled by a payroll card; and distributing the payroll card to the employee so that the employee may access the payroll finds with the payroll card.

According to another embodiment of the invention, a method of distributing funds to an employee of a company can be accomplished by receiving the payroll funds owed to the employee from a company employing the employee; allocating the payroll funds to an account controlled by a payroll card; and distributing the payroll card to the employee so that the employee may access payroll finds using the payroll card.

According to yet another embodiment of the invention, a method of obtaining money from an account can be accomplished by receiving a payroll card operable for receiving payroll funds; presenting the payroll card at a facility so as to enable access to the payroll funds; and receiving return of the payroll card at the facility once the payroll card is made operable to access the payroll funds.

Still another embodiment of the invention provides a method of distributing funds from an absent parent of a child to a custodial parent of the child. This embodiment of the invention can be established by receiving funds from an absent parent; allocating the funds to an account for access by a custodial parent; distributing a child support payment card to the custodial parent of the child; and configuring the child support card so as to allow the custodial parent to access the funds allocated to the account from the absent parent.

A further embodiment of the invention provides a method of earning interest on deposited payroll funds by receiving from an employer funds to be distributed to an employee; disposing the funds in a first account; indicating in a computer file the availability of the funds for distribution to the employee after receiving the funds from the employer; receiving a request for the funds from the employee; confirming the availability of the funds for distribution to the employee by checking the computer file; and if the funds are available, distributing the funds to the employee; and accruing interest on the funds during the time period between when the funds are received from the employer and the time when the funds are distributed to the employee without an obligation of crediting the interest to the employer or the employee.

DESCRIPTION

Figure 1:
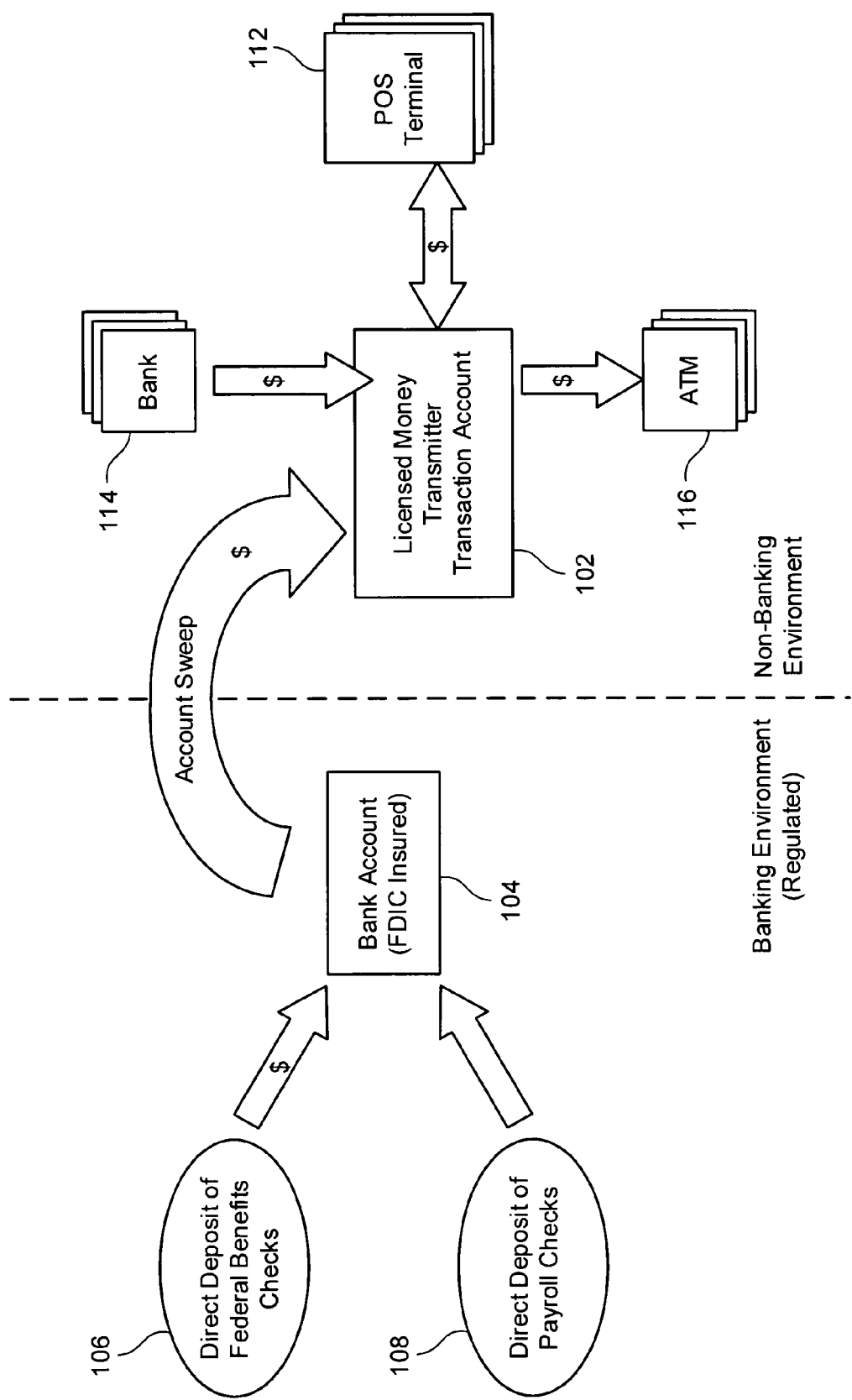
FIG. 1 is a functional block diagram illustrating the movement of funds through an exemplary account structure according to one embodiment of the invention.

Members of the cash based society, e.g., the non-banked society, may avoid drawbacks associated with traditional banking relationships by conducting business with Licensed Money Transmitters. An example of a Licensed Money Transmitter is Western Union. A Licensed Money Transmitter is legally authorized to transmit funds, either by wire, facsimile, electronic transfer, courier or otherwise, within the United States or to or from locations outside the United States. A Licensed Money Transmitter may also be authorized to sell or issue checks, drafts, warrants, money orders, traveler's checks or other negotiable instruments. In some instances, a Licensed Money Transmitter may even be authorized to sell and/or exchange currency. Unlike traditional bank transactions, however, transactions handled by a Licensed Money Transmitter are not insured by the FDIC.

A Licensed Money Transmitter may accept from its consumers advance payments for negotiable instruments. By way of an online, non interest bearing, non FDIC insured transaction account, the Licensed Money Transmitter may provide payment instrument and money transmission services to its cash based consumers without the need for the qualifying/approval barriers, high costs, and intricate fee and reporting obstacles associated with a traditional banking relationship. For example, the transaction account maintained by the Licensed Money Transmitter may be configured to accept deposits from a point of sale (POS) terminal at a retail establishment. In an exemplary embodiment, the transaction account may also be configured to indirectly accept direct deposits of funds, such as federal benefits checks and employee payroll checks.

The consumer may access his or her pre paid negotiable instruments electronically via a POS terminal or an automated teller machine (ATM). Upon demand, a negotiable instrument, such as a money order, may be printed and cashed for the consumer at a POS terminal by an agent of the Licensed Money Transmitter. Negotiable instruments may be printed in odd/specific amounts so that the customer may receive cash in odd/specific denominations for the purpose of paying bills, etc. Alternately, an ATM may dispense the requested cash to the consumer.

Since the transaction account maintained by the Licensed Money Transmitter is not built around the classic FDIC insured demand deposit account (DDA) structure, overall system costs, and ultimately consumer costs, are reduced. For example, because the funds deposited into the transaction account are considered as advance payments for negotiable instruments, no credit approvals are required. Also, because withdrawals from the transaction account are processed on line and in real time, mechanisms may be provided for ensuring that there are no account overdrafts. Without overdrafts, there is no need to worry about fees attributable to an overdrawn account status.

By establishing a non banking service that offers POS and ATM access to cash, the present embodiment of the invention allows cash based consumers to avoid visitations to bank branches that may not be conveniently located. Instead, the cash based consumer may hear about the services of the present invention and receive enrollment materials at the same locations at which they conduct other financial or retail transactions, or through direct advertising. Consumers may transfer funds directly from the service desk (via a POS terminal) of a preferred retailer at a time of day that is convenient for their lifestyles. Consumers may also be provided with "VRU" or "Voice 24×7" services so as not to be made dependent only on ATMs and agents operating POS terminals.

As mentioned above, an exemplary transaction account may also be configured to indirectly accept direct deposit transactions. The transaction account is not configured to directly accept direct deposit transactions due to the desire of the cash based consumer to avoid a traditional banking relationship. Various federal regulations, which are well known to those skilled in the art, require that certain direct deposit transactions involve FDIC insured bank accounts, and the like. For example, direct deposit of federal benefits checks may only be made into traditional FDIC insured bank accounts.

Similarly, banking industry requirements require that other types of direct deposit transactions involve a traditional bank account. By way of illustration, direct deposit of payroll checks are made through an automated clearinghouse (ACH) system, which uses routing and transit (R&T) numbers and other data to effect the transfer of funds between accounts. R&T numbers are assigned exclusively to FDIC insured banks. Therefore, in order to meet the cash based consumer's demand for non-banking services, the Licensed Money Transmitter may choose not to directly offer direct deposit capabilities that are subject to federal banking regulations and banking industry requirements.

An exemplary flow of funds through an illustrative account system is described with reference to the functional block diagram of FIG. 1. As shown, a transaction account 102 is established and maintained by a Licensed Money Transmitter or an agent thereof. The transaction account 102 may be thought of as a general account held in the name of the Licensed Money Transmitter. The general account may be divided into sub-accounts that are associated with individual consumers. Alternatively, separate transaction 102 accounts may be established in the names of each individual consumer.

Due to various federal regulations and industry requirements, the transaction account 102 is not FDIC insured and is not authorized to accept funds that are transferred through the Automatic Clearinghouse (ACH) system of the federal reserve. The ACH is an electronic funds transfer system used by retail and commercial organizations. The ACH acts as a normal clearing house, receiving a transaction over the network and then splitting and routing the debit and credit portions of the transaction to the payer's and the payee's banks. Without ACH access, the transaction account 102 is not authorized to accept direct deposits of federal benefits checks, payroll checks from employers, or the like.

Accordingly, a Licensed Money Transmitter can establish a communication channel with a traditional FDIC insured financial institution, such as a bank, in order to service direct deposit customers. The bank will maintain an FDIC insured bank account 114, which may either be held in the name of the Licensed Money Transmitter or in the name of an individual consumer. The bank account 104 is capable of accepting federal benefit direct deposits 106 and payroll direct deposits 108, as well as any other type of federally regulated or banking industry standardized transfer of funds. The communication channel between the Licensed Money Transmitter and the bank may allow the Licensed Money Transmitter to monitor the bank account 104 for incoming direct deposit transactions.

Incoming direct deposit transactions can be "swept" from the bank account 104 into the transaction account 102. In other words, funds that are deposited in the bank account 104 can be instantly transferred into the transaction account 102. The instant transfer of funds avoids capitalization of the bank, i.e., no interest on the funds is accumulated. Accordingly, the communication channel between the Licensed Money Transmitter and the bank allows customers of the Licensed Money Transmitter to take advantage of direct deposit mechanisms, without themselves having to become customers of a bank. In addition, non direct deposit funds may be deposited into the transaction account 102 via a POS terminal 112 or via any other bank 114 or financial institution.

Funds that are held in the transaction account 102 may be dispersed to the customer through a POS terminal 112 operated by an agent of the Licensed Money Transmitter, or through a traditional ATM 116. POS terminals 112 and ATMs 116 allow a consumer to conduct a transaction from remote locations. ATMs comprise computer terminals that may be configured for remote access, directly or indirectly through switching networks, to a financial account of the consumer, such as a bank account 104 or a transaction account 102. Similarly, POS devices 112 comprise computer terminals located at a merchant's place of business which allow access to a consumer's account information stored in a computer within a network of financial institutions, to permit the transfer of funds from the consumer's account to the merchant's account.

Figure 2:
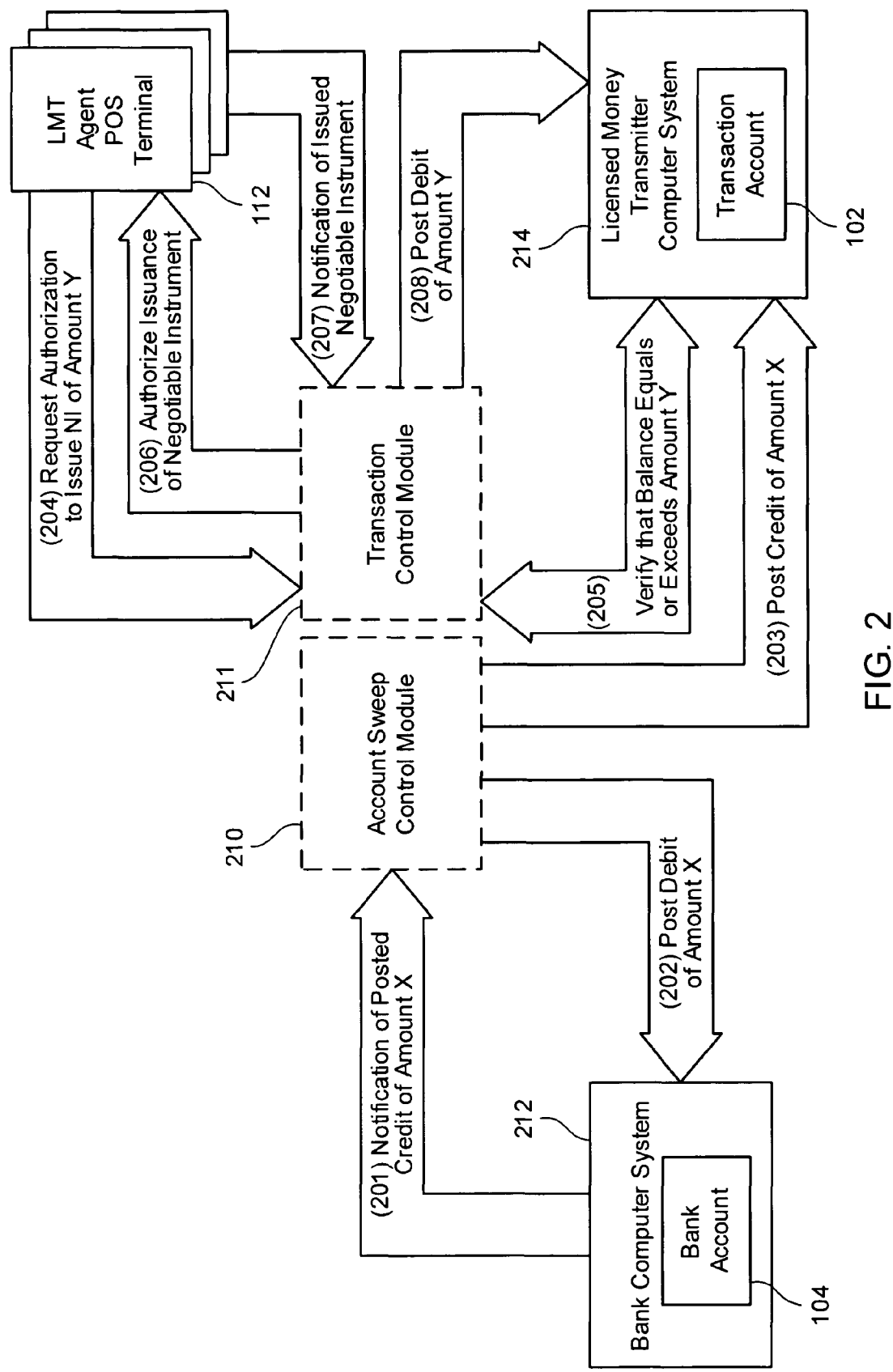
FIG. 2 is a functional block diagram illustrating the process flow according to one embodiment of the invention.

FIG. 2 illustrates the process flow of an account sweep control module 210, which may be implemented through one or more software program modules. The account sweep control module 211 facilitates communications between a bank computer system 212 and a Licensed Money Transmitter (LMT) computer system 214. In particular, the account sweep control module 210 facilitates the transfer of finds between a bank account 104 accessible by the bank computer system 212 and a transaction account 102 accessible by the Licensed Money Transmitter computer system 214. The account sweep control module 210 may be implemented as a component of the Licensed Money Transmitter computer system 214, as a component of the bank computer system 212, or as a component of a distinct computer system. The account sweep control module 211 is configured to monitor the bank account 104 in order to detect the posting of a credit to the bank account 104. As shown in step 201, an exemplary embodiment of the account sweep control module 210 receives a notification from the bank computer 212 whenever a credit is posted to the bank account 104. Methods of configuring the software and hardware of the bank computer system 212 to send a notification to the account sweep control module 210 upon the posting of a credit to the bank account 104 will be apparent to those skilled in the art.

When a notification of a posted credit is received, the exemplary account sweep control module 210 communicates with the bank computer 212 at step 212 in order to post a debit to the bank account 104. In the ideal situation, the credit of funds exists in the bank account 104 for a period of time that is on the order of a fraction of a second prior to the posting of the debit. The credit of funds posted to the bank account 104 may be in any "amount X." The subsequent debit posted by the account sweep control module 210 to the bank account 104 is in the total "amount X." Accordingly, the bank account 104 is "zeroed out" and, except for a fraction of a second or so, maintains a balance of zero. The debit is posted to the bank account 104 instantly so as to avoid capitalization of the bank.

At step 203, the exemplary account sweep control module 210 communicates with the Licensed Money Transmitter computer system 214 in order to post a credit of the total "amount X" into the transaction account 102. The transaction account 102 is a holding or escrow account that is used to store the funds of the consumer. The transaction account 102 does not accrue interest and does not function as a traditional bank account. The finds in the transaction account 102 may represent prepaid negotiable instruments that may be issued to the consumer via a POS terminal 112 operated by an agent of the Licensed Money Transmitter.

When a consumer requests the issuance of a prepaid negotiable instrument, a request for authorization to issue the negotiable instrument may be transmitted from a POS terminal 112 to a transaction control module 211. A transaction control module may be implemented through one or more software program modules. The transaction control module 211 may be implemented as a component of the Licensed Money Transmitter computer system 214, or as a component of a distinct computer system. A transaction control module 211 is configured to interact with the transaction account 102 and POS terminals 112 in order to manage transactions. By way of illustration, a POS terminal 112 may request authorization to issue a negotiable instrument of amount "Y," as shown in step 204. The transaction control module 211 accepts the request for authorization and communicates at step 205 with the Licensed Money Transmitter computer system 214 in order to verify that the balance of the transaction account 102 equals or exceeds the requested amount "Y" plus any transaction fees charged by the Licensed Money Transmitter. The transaction control module 211 may also be responsible for verifying that the customer requesting the negotiable instrument is in fact authorized to receive the negotiable instrument. For example, the customer may be required to provide a personal identification number (PIN) and an account code, which may be transmitted from the POS terminal 112 to the transaction control module 211. The transaction control module 211 may communicate with a database (not shown) hosted by the Licensed Money Transmitter computer system 214 in order to determine whether the PIN and account code provided by the customer are authentic. Additional details regarding security features of the illustrative embodiments of the present invention will be described below.

If the balance in the transaction account 102 equals or exceeds the requested amount "Y" plus any transaction fees, the transaction control module 211 transmits to the POS terminal 112 an authorization to issue the requested negotiable instrument, as shown in step 206. However, if the balance in the transaction account 102 is less than the requested amount "Y" plus any transaction fees, the transaction control module 211 will not authorize the issuance of the requested negotiable instrument. As mentioned, the funds held in the transaction account 102 are considered to represent prepaid negotiable instruments. Therefore, the transaction account 102 will not be debited in any amount that exceeds the prepaid value of the negotiable instruments plus any transaction fees. Transaction fees may be charged at the time of the transaction so as to avoid the situation where the transaction account 102 is depleted and the customer owes a debt to the Licensed Money Transmitter, ensuring that the transaction account 102 is never overdrawn and avoiding the need to charge additional service fees associated with an overdrawn account status.

After receiving authorization to issue the requested negotiable instrument, the agent of the Licensed Money Transmitter operating the POS terminal 112 prints and cashes the negotiable instrument in the amount "Y" plus any transaction fees. The agent may then retain any transaction fees and provide the remainder of the cash to the consumer. At step 207, the POS terminal 112 notifies the transaction control module 211 that the negotiable instrument has been issued. Then, at step 208 the transaction control module 211 communicated with the Licensed Money Transmitter computer system 214 in order to post a debit in the amount "Y" plus any transaction fees to the transaction account 102.

The exemplary embodiments described with respect to FIG. 1 and FIG. 2 include a two account structure (i.e., a bank account 104 and a transaction account 102) and an account sweep control module 210. It will be appreciated by those of ordinary skill in the art that the two account structure and the account sweep control module 210 are not necessary in situations where there is no desire to indirectly provide direct deposit capabilities. Various features and aspects of the present invention may be implemented in systems that do not require such direct deposit capabilities. In addition, it should be appreciated that the functionality of the account sweep control module 210 and the transaction control module 211 has been provided by way of example only. Additional functions may be performed by either module without limitation of the scope of the present invention.

Figure 3:
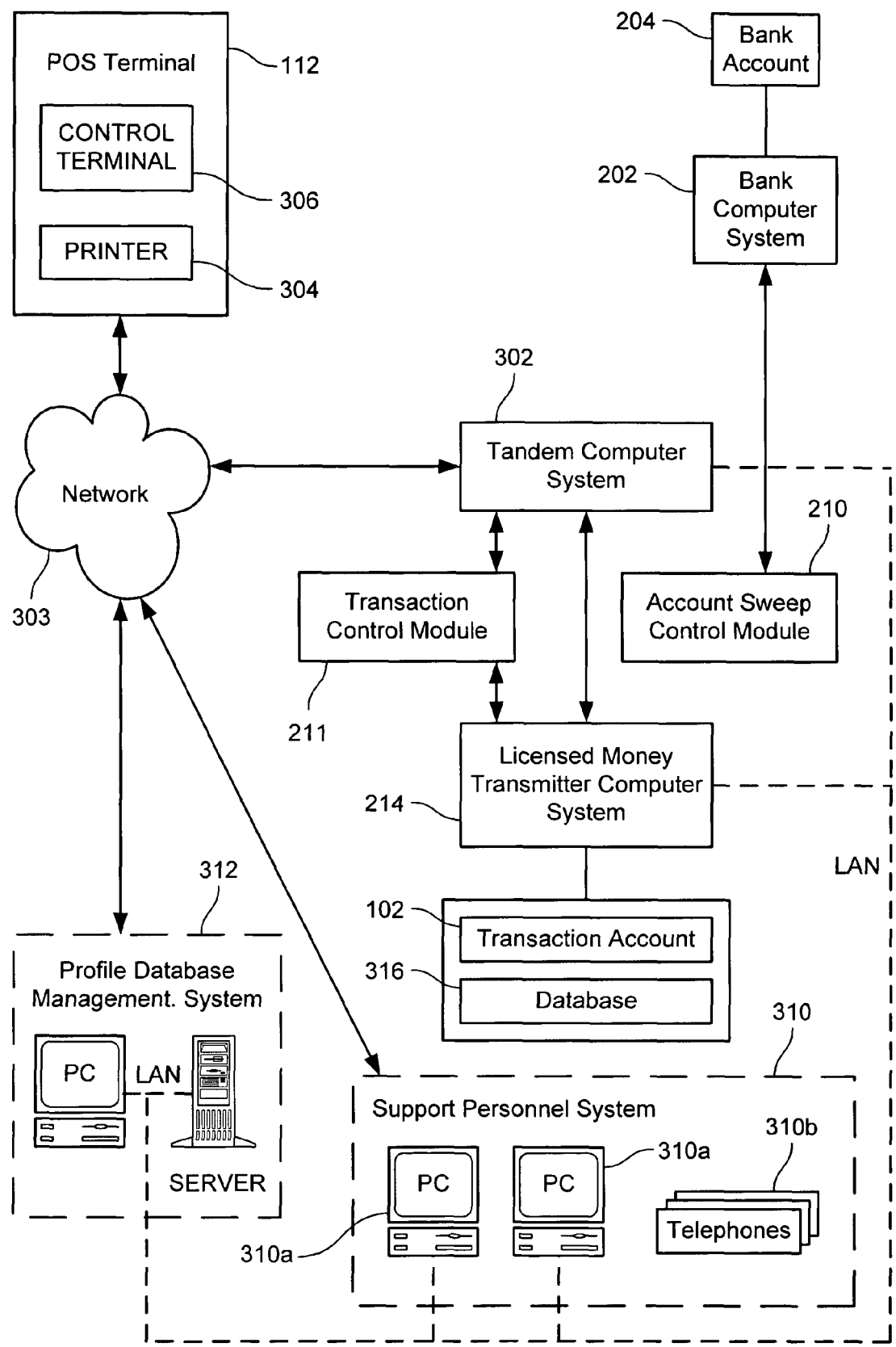
FIG. 3 is a functional block diagram illustrating an exemplary financial network environment according to one embodiment of the invention.

FIG. 3 is an overview of an exemplary Licensed Money Transmitter network environment 301 that may host a system in accordance with the illustrative embodiments of the present invention. A POS terminal 112 communicates with a Tandem computer system 302 via a network 303. The Tandem computer system 302 may be in communication with, or may comprise a part of, the Licensed Money Transmitter computer system 214. Although the functionality of a "Tandem" brand computer system is well known in the art, as used herein a Tandem computer system 302 may refer to any generic network server system. A POS terminal 112 generally includes a printer 304 and a control terminal 306. The control terminal 306 typically comprises a keypad, a display, a modem, a memory, and a processor. The control terminal 306 may communicate print commands to the printer 304 via, for example, an RS 232 link or other suitable communications link. The control terminal 306 manages negotiable instrument transactions and stores data in a memory.

A profile database management system 312 may be provided for management of the POS terminals 112. In manners well known in the art, software updates and other data may be downloaded from the profile database management system 312 to a POS terminal 112. Such software updates and other data may be generated and stored in the profile database management system 312 by a Licensed Money Transmitter support personnel system 310. The Licensed Money Transmitter support personnel system 310 may include personal computers 310a operated by support personnel and telephones 310b manned by support personnel or linked to VRU systems. The Licensed Money Transmitter support personnel system 310 may be coupled to the profile database management system 312 via a local area network (LAN) or other private communications link. The Licensed Money Transmitter support personnel system 310 may also be linked to the network 303, so as to be accessible to customers via telephone systems.

At predetermined times, the control terminal 306 of the POS terminal 112 transmits its data to the Tandem computer system 302 via the network 303. The Tandem computer system 302 creates a batch file comprising data received from many POS terminals 112. The Tandem computer system 302 typically forwards batch files to the appropriate component of the Licensed Money Transmitter computer system 214 at predetermined times. For security purposes, the Tandem computer system 302 may transmit a batch file to the Licensed Money Transmitter computer system 214 via a private network or other private communications link.

The Licensed Money Transmitter computer system 214 can be configured for, among other things, accessing the transaction account 102 maintained by the Licensed Money Transmitter. The transaction account 102 may be physically stored in a memory device in communication with the Licensed Money Transmitter computer system 214. The Licensed Money Transmitter computer system 214 may also host a database 316 of account codes, PINs, and other customer/account information. Such customer/account information may be used for security purposes and to monitor the nature and frequency of transactions performed by each customer.

The Licensed Money Transmitter computer system 214 may also comprise or be in communication with the account sweep control module 210. The account sweep control module 210 is in turn in communication with the bank computer system 212. The bank computer system 212 is configured for, among other things, accessing the bank account 104, which may be stored physically in a memory device in communication with the bank computer system 212.

The Tandem computer system 302 may be in communication with the transaction control module 211. Thus, communications to and from the POS terminal 112 may be routed from and to the transaction control module 211 via the Tandem computer system 302. As mentioned, the transaction control module 211 is configured to manage transactions involving deposits into and withdrawals from the transaction account 102. Although shown as being a distinct network component, those skilled in the art should appreciate that the transaction control module 211 may alternately be implemented as a component of either the Tandem computer system 302 or the Licensed Money Transmitter computer system 214.

Figure 4:
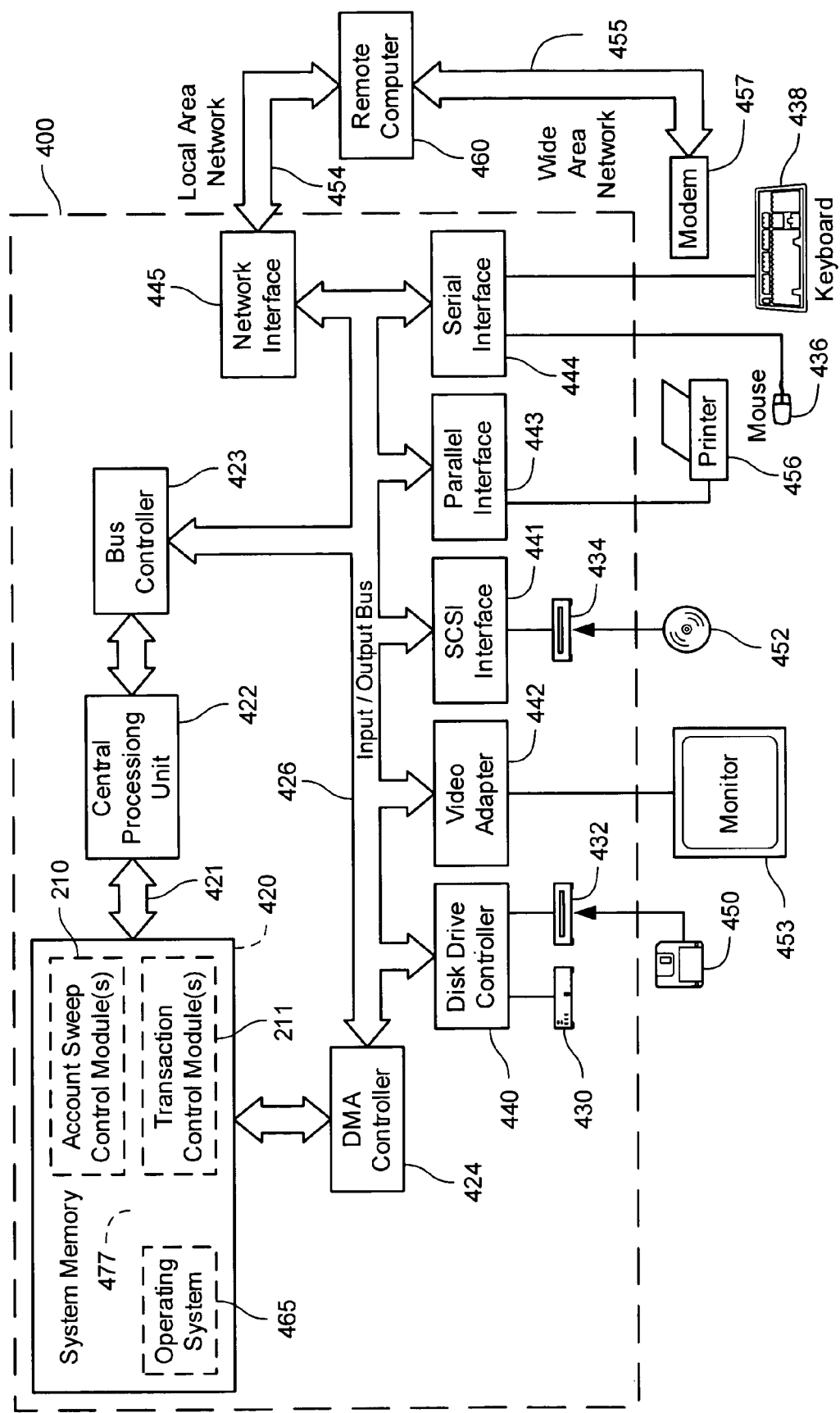
FIG. 4 is a functional block diagram of a computer system illustrating an operating environment according to one embodiment of the invention.

FIG. 4 and the following discussion are intended to provide a brief and general description of a suitable computing environment for implementing various aspects of various embodiments of the invention. Although the system shown in FIG. 4 is a conventional computer 411, those skilled in the art will recognize that the invention also may be implemented using other types of computer system configurations. The computer 400 includes a central processing unit 422, a system memory 420, and an Input/output ("I/O") bus 426. A system bus 421 couples the central processing unit 422 to the system memory 420. A bus controller 423 controls the flow of data on the I/O bus 426 and between the central processing unit 422 and a variety of internal and external I/O devices. The I/O devices connected to the I/O bus 426 may have direct access to the system memory 420 using a Direct Memory Access ("DMA") controller 424.

The I/O devices may be connected to the I/O bus 426 via a set of device interfaces. The device interfaces may include both hardware components and software components. For instance, a hard disk drive 430 and a floppy disk drive 432 for reading or writing removable media 450 may be connected to the I/O bus 426 through a disk drive controller 440. An optical disk drive 434 for reading or writing optical media 452 may be connected to the I/O bus 426 using a Small Computer System Interface ("SCSI") 441. The drives and their associated computer readable media provide nonvolatile storage for the computer 400. In addition to the computer readable media described above, other types of computer readable media may also be used, such as ZIP drives or the like.

A display device 453, such as a monitor, is connected to the I/O bus 426 via another interface, such as a video adapter 442. A parallel interface 443 connects synchronous peripheral devices, such as a laser printer 456, to the I/O bus 426. A serial interface 444 connects communication devices to the I/O bus 426. A user may enter commands and information into the computer 400 via the serial interface 444 using an input device, such as a keyboard 438, a mouse 436 or a modem 457. Other peripheral devices (not shown) may also be connected to the computer 400, such as audio input/output devices or image capture devices.

A number of software program modules may be stored on the drives and in the system memory 420. The system memory 420 can include both Random Access Memory ("RAM") and Read Only Memory ("ROM"). The software program modules control the manner in which the computer 400 functions and interacts with the user, with I/O devices or with other computers. Software program modules include routines, operating systems 465, application programs, data structures, and other software or firmware components. In an exemplary embodiment, the present invention may include one or more account sweep control modules 210 and one or more transaction control modules 211. The one or more account sweep control modules 210 may comprise computer executable instructions for facilitating communications between a bank computer system 212 and a Licensed Money Transmitter computer system 214. The one or more account sweep control modules 210 may further comprise computer executable instructions for monitoring credits posted to a bank account 114, posting debits to the bank account 104 and posting credits to the transaction account 102, as previously described. The one or more transaction control modules 211 may comprise computer executable instructions for facilitating communications between a POS terminal 112 or an ATM 116 and a Licensed Money Transmitter computer system 214, as previously described.

Many or most of the software controlled operations performed by the exemplary software program modules of the present invention are conventional and well known in the industry. For example, it is conventional and well known to communicate standard ATM and POS messages between a computer system and an ATM network using conventional off the shelf ATM and POS software. In an exemplary embodiment, the computer 400 also includes such conventional software to generate and communicate appropriate messages. Conventional software packages also exist which perform a variety of exceedingly complex but entirely conventional functions (e.g., maintaining audit trails to ensure transaction reliability, maintaining user account and vendor files, providing clearing information, etc.). Such conventional software program modules may also be executed by the computer 400 in an exemplary embodiment. Conventional database management systems may also be executed by the computer 400 for maintaining customer/account information.

The computer 400 may operate in a networked environment using logical connections to one or more remote computers, such as remote computer 460. The remote computer 460 may be a server, a router, a peer device or other common network node, and typically includes many or all of the elements described in connection with the computer 401. In a networked environment, program modules and data may be stored on the remote computer 460. The logical connections depicted in FIG. 4 include a local area network ("LAN") 454 and a wide area network ("WAN") 455. In a LAN environment, a network interface 445, such as an Ethernet adapter card, can be used to connect the computer 400 to the remote computer 460. In a WAN environment, the computer 400 may use a telecommunications device, such as a modem 457, to establish a connection. It will be appreciated that the network connections shown are exemplary and other means of establishing a communications link between the computers may be used.

Figure 5:
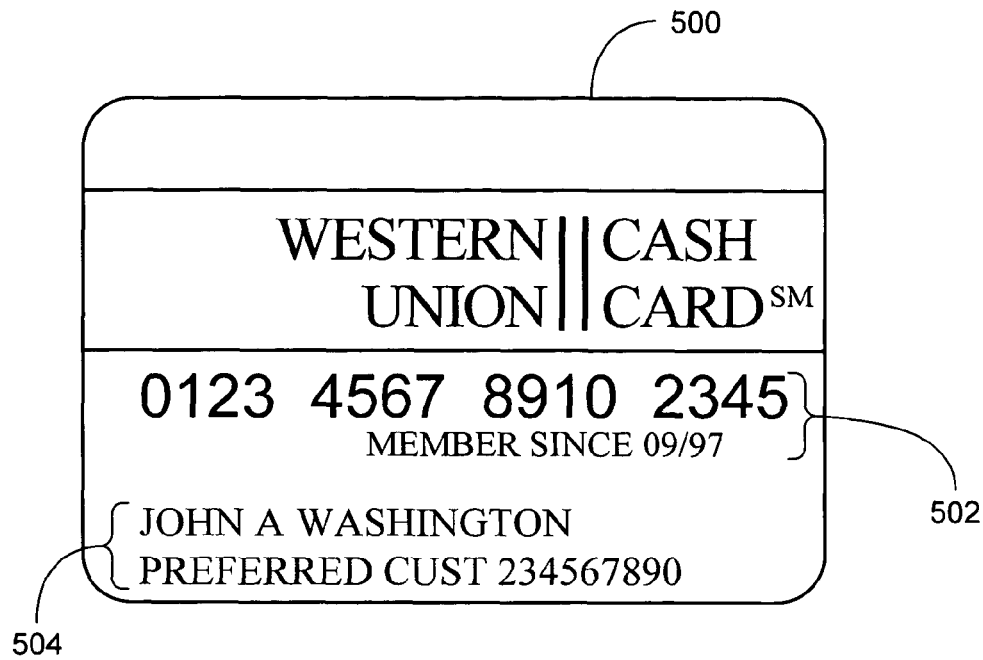
FIG. 5 is an illustration of an exemplary cash card according to one embodiment of the invention.

Aspects of one embodiment of the invention may be implemented by way of any account identifying mechanism, such as a plastic card issued to a particular consumer. As shown in FIG. 5, in an exemplary embodiment a consumer is provided with a cash card 500 that includes identifying information on the front and an encoded magnetic strip on the reverse. Identifying information may include an account identification code 502 and a customer name and number 514. The identifying information may be used to associate a transaction account 102 or a sub-account thereof with the particular consumer.

From the consumer's point of view, funds may be loaded onto and off loaded from the cash card 500 at any time. Thus, the cash card 500 eliminates the cash based consumer's need to carry large amounts of cash on his or her person. As previously described, the consumer may authorize the deposit of funds into a transaction account 102 associated with the cash card 500 in various ways, such as through direct deposit transactions, POS transactions, ATM transactions, etc. Subsequently, upon presentation of a cash card 500 or other account identifier and a personal identification number (PIN), the consumer may access the finds that are stored in his or her name in the transaction account 102.

To request a withdrawal of funds from the transaction account 102, a consumer may present the cash card 500 to an agent of the Licensed Money Transmitter operating a POS terminal 112. Alternately, the cash card may be presented at an ATM 116. The account identification code 502 may be read by the agent or an automated reader from the front of the cash card 500 or from the encoded magnetic strip on the reverse of the cash card 500. The account identification code 502, a PIN obtained from the consumer, and other data, such as a requested amount of funds, are transmitted to the transaction control module 211 as a request for issuance of a negotiable instrument. As described previously, the transaction control module 211 interacts with the Licensed Money Transmitter computer system 214 in order to effect an electronic transfer of funds from the transaction account 102 to the POS terminal 112 or the ATM 116 that generated the request for funds. In a similar fashion, the cash card 500 may be presented to an agent at a POS terminal 112, an ATM 116, or a teller at a bank 114 in order to conduct a transaction for the deposit of funds into the transaction account 102.

Accordingly, in one embodiment of the invention, a cash card 500 is issued in the name of a particular consumer upon that consumer's enrollment as a customer of the Licensed Money Transmitter. Enrollment may entail the provision of certain customer information, such as name, address, phone number, social security number, etc. For liability and/or security purposes, the Licensed Money Transmitter may require some or all of the above-listed customer information prior to providing a consumer with full privileges for depositing and withdrawing funds into and out of the transaction account 102.

Figure 6:
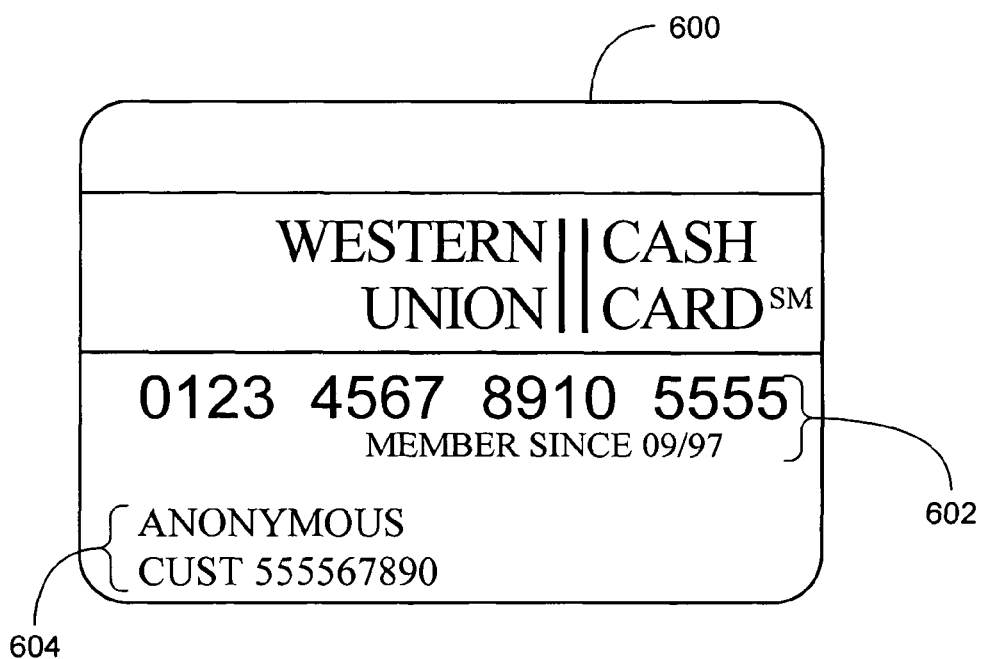
FIG. 6 is an illustration of an exemplary anonymous cash card according to one embodiment of the invention.

As shown in FIG. 6, an alternate embodiment of the invention involves the issuance of an anonymous cash card 600. An anonymous cash card 600 includes an account identification code 602 and an anonymous customer indicator 614. An anonymous cash card 600 may be associated with an anonymous transaction account or an anonymous sub-account within the transaction account 102. The anonymous account is identified only by an account code and a PIN that is provided to the consumer of the anonymous cash card 600. The anonymous cash card 600 may be a one load cash card, meaning that funds may be deposited into the associated anonymous transaction account only one time. Once the initially loaded funds are depleted from the anonymous transaction account, the anonymous cash card 600 is no longer valid (unless it is converted to a "regular" cash card 500, as will be described below).

An anonymous cash card 600 may be sold or otherwise provided to a consumer, who may then request that a particular amount of funds be loaded onto the anonymous cash card 600. The consumer of the anonymous cash card 600 is provided with a PIN, which may be used to authorize loading of the anonymous cash card 600. Funds to be loaded onto the anonymous cash card 600 are collected by, for example, an agent of the Licensed Money Transmitter. A credit in the amount of the collected funds is then posted to the anonymous transaction account in the manner previously described. In accordance with one embodiment of the present invention, an anonymous cash card 600 may be loaded by the consumer only at a POS terminal 112. Given the anonymous nature of anonymous cash card 600 transactions, no direct deposit capabilities are provided.

The funds to be loaded onto the anonymous cash card 600 may be limited to specific or incremental dollar amounts. For example, it may be a policy of the Licensed Money Transmitter that no anonymous cash card 600 may be loaded with more than a predetermined value. Alternately, an anonymous cash card 600 having a first load limit may be sold to consumers for a first price, while an anonymous cash card 600 having a second load limit may be sold to consumers for a second price, etc. In another embodiment, an anonymous cash card 600 may be pre loaded with a particular amount of funds. In this manner, the Licensed Money Transmitter may store funds of a predetermined amount in the anonymous transaction account associated with the anonymous cash card 600. Then, the pre-loaded anonymous cash card 600 may be sold to a consumer for a price equal to the predetermined amount plus any additional service fees.

As mentioned, an anonymous cash card 600 may expire upon depletion of the initially loaded funds. An expired anonymous cash card 600 may no longer be used by the consumer to deposit finds into or withdraw funds from a transaction account 102. However, the present invention contemplates that an anonymous cash card 600 may be converted into a "regular" cash card 500 that carries full reload and access privileges, including direct deposit capabilities. Conversion from an anonymous cash card 600 to a regular cash card 500 requires that the consumer enroll as a customer of the Licensed Money Transmitter. As mentioned above, enrollment entails providing certain customer and account specific information. Enrollment may be performed over the telephone, via the mail, or through any other suitable communications medium. When the consumer has successfully enrolled as a customer, the Licensed Money Transmitter may provide the customer with a new cash card 500 and PIN. As is well known in the art, the customer may choose the PIN to be associated with his or her transaction account 102. Alternately, although less desirably, the newly enrolled customer may continue to use the original anonymous cash card 600 and the associated PIN as if it were a regular cash card 500.

Figure 7:
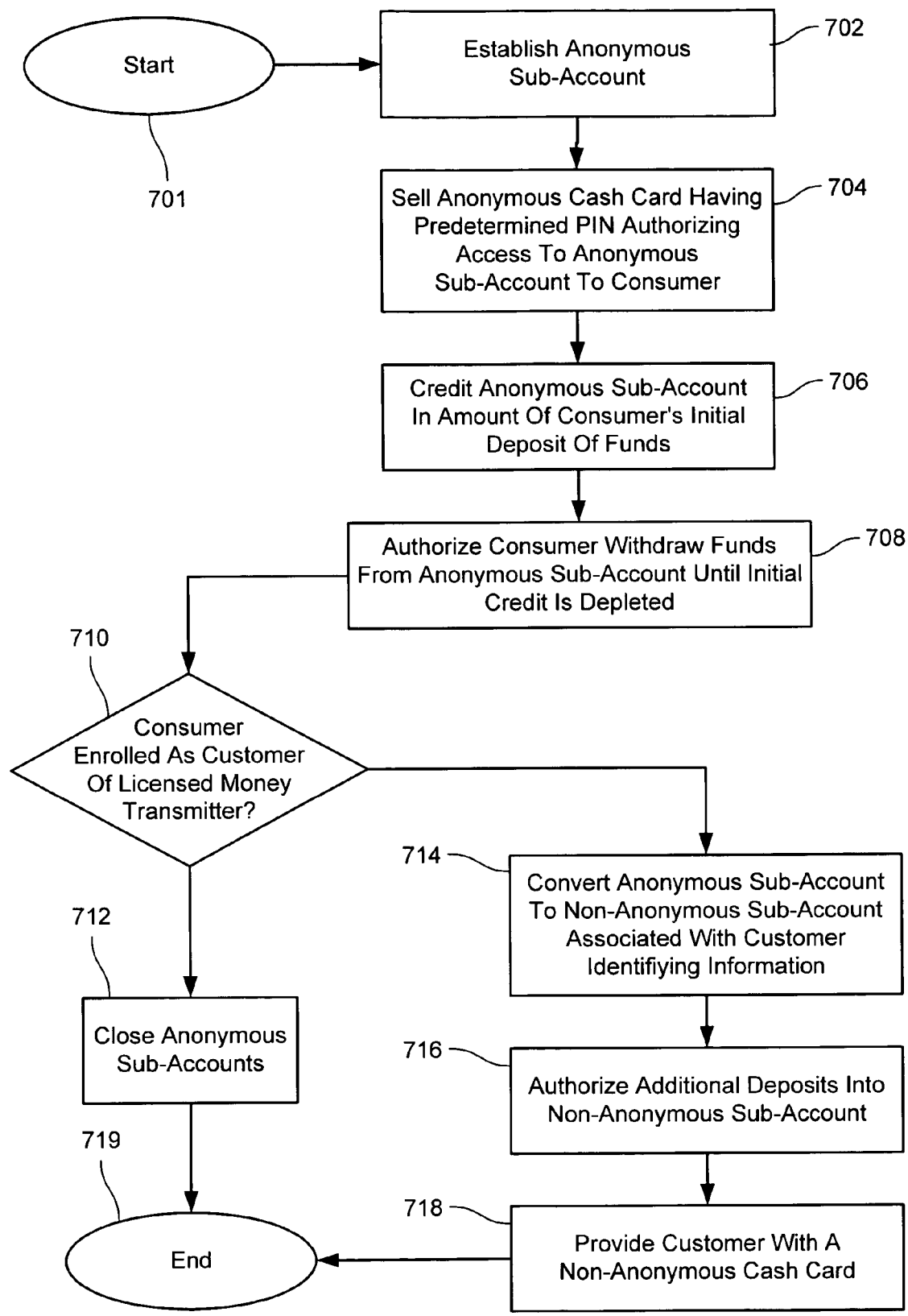
FIG. 7 is a flow diagram illustrating an exemplary method for processing transactions associated with an anonymous cash card.

FIG. 7 is a flow chart illustrating an exemplary method for processing transactions associated with an anonymous cash card 600. From starting block 701, the method advances to step 702 where an anonymous sub-account is established within the transaction account 102. The anonymous sub-account is identified only by an account code and is not associated with any consumer identifying information. At step 704, the anonymous cash card 600 is sold to a consumer. Along with the anonymous cash card, the consumer is also provided a PIN that authorizes access to the anonymous sub-account.

The consumer may then request an initial load of the anonymous cash card 600 by presenting the anonymous cash card 600, PIN, and funds to an agent of the Licensed Money Transmitter. At step 706, a credit in the amount of the consumer's initial funds deposit is posted to the anonymous sub-account associated with the anonymous cash card 600. Once funds are loaded onto the anonymous cash card 600, the method proceeds to step 708, where withdrawals may be made until the initial finds have been depleted. At step 710 a determination is made as to whether the consumer has enrolled as a customer of the Licensed Money Transmitter. If the consumer has not enrolled, the method proceeds to step 712 where the anonymous sub-account is closed and the anonymous cash card 600 is considered to be expired.

However, if the consumer has enrolled as a customer of the Licensed Money transmitter, the method proceeds to step 714, where the anonymous sub-account is converted into a non-anonymous sub-account associated with customer identifying information. Then at step 716, the non-anonymous sub-account is authorized to receive additional deposits from the customer. At step 718, the customer may be provided with a new non-anonymous cash card 500 that is issued in the customer's name and has customer/account information encoded on a magnetic strip or other data storage mechanism. The method ends at step 719.

Payroll Distribution

Figure 8:
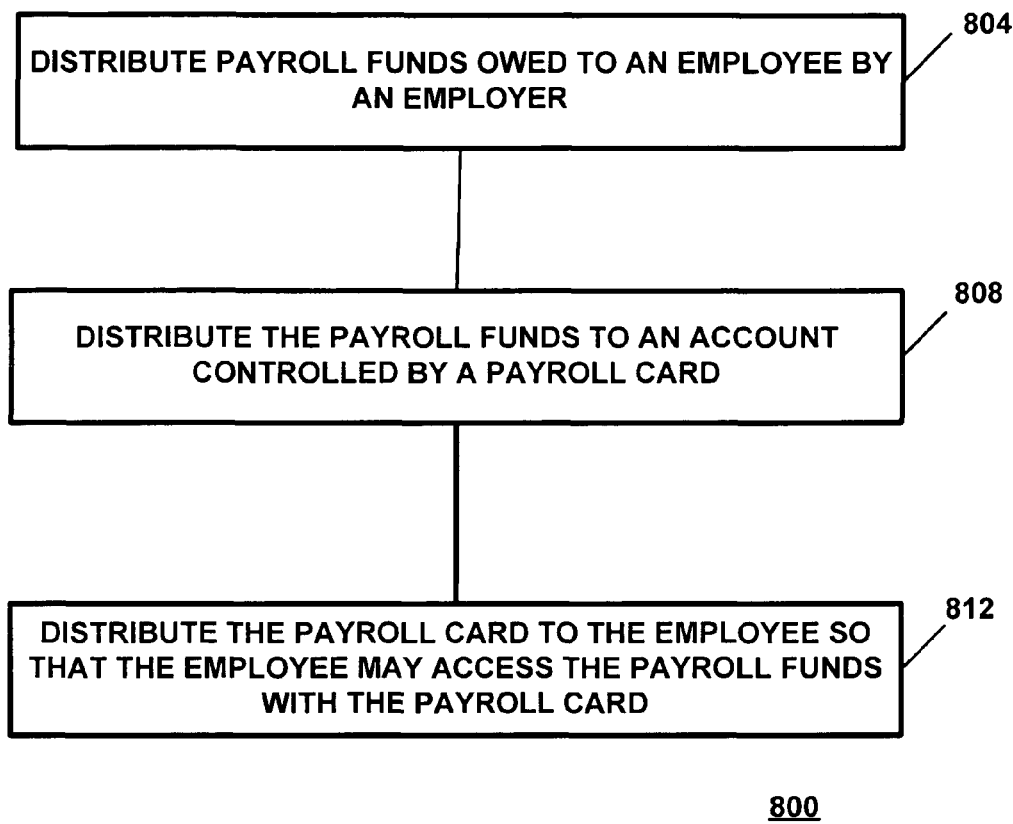
FIG. 8 is a flowchart illustrating a method of distributing payroll funds according to one embodiment of the invention.

Referring now to FIG. 8, a flowchart 800 illustrates a method of distributing payroll funds according to one embodiment of the invention. Payroll funds are often difficult to distribute other than by check to those who do not have a bank account. A large segment of the population functions without a bank account due to their inability to qualify or due to a lack of interest in paying the sometimes significant fees involved with maintaining a bank account. Therefore, they tend to rely on keeping their cash at hand by cashing their paycheck at the bank that issues the check. This causes an imposition on the employee in that the employee must travel to that bank in order to cash the check. Alternatively, they might travel to a cash checking location which cashes payroll checks. However, this often involves a fee paid from the cashed check. Therefore, the employee is disadvantaged here in having to travel to an inconvenient location or paying out a portion of the cashed check to obtain access to the cash itself.

FIG. 8 illustrates a method of distributing payroll funds to employees according to one embodiment of the invention. In block 804, payroll finds owed to an employee by an employer are distributed. These payroll funds can be distributed to a third-party account for safekeeping. In block 808, the payroll funds are distributed to an account controlled by a payroll card. Finally, in block 812, the payroll card is distributed to the employee so that the employee may access the payroll funds with the payroll card.

Figure 9:
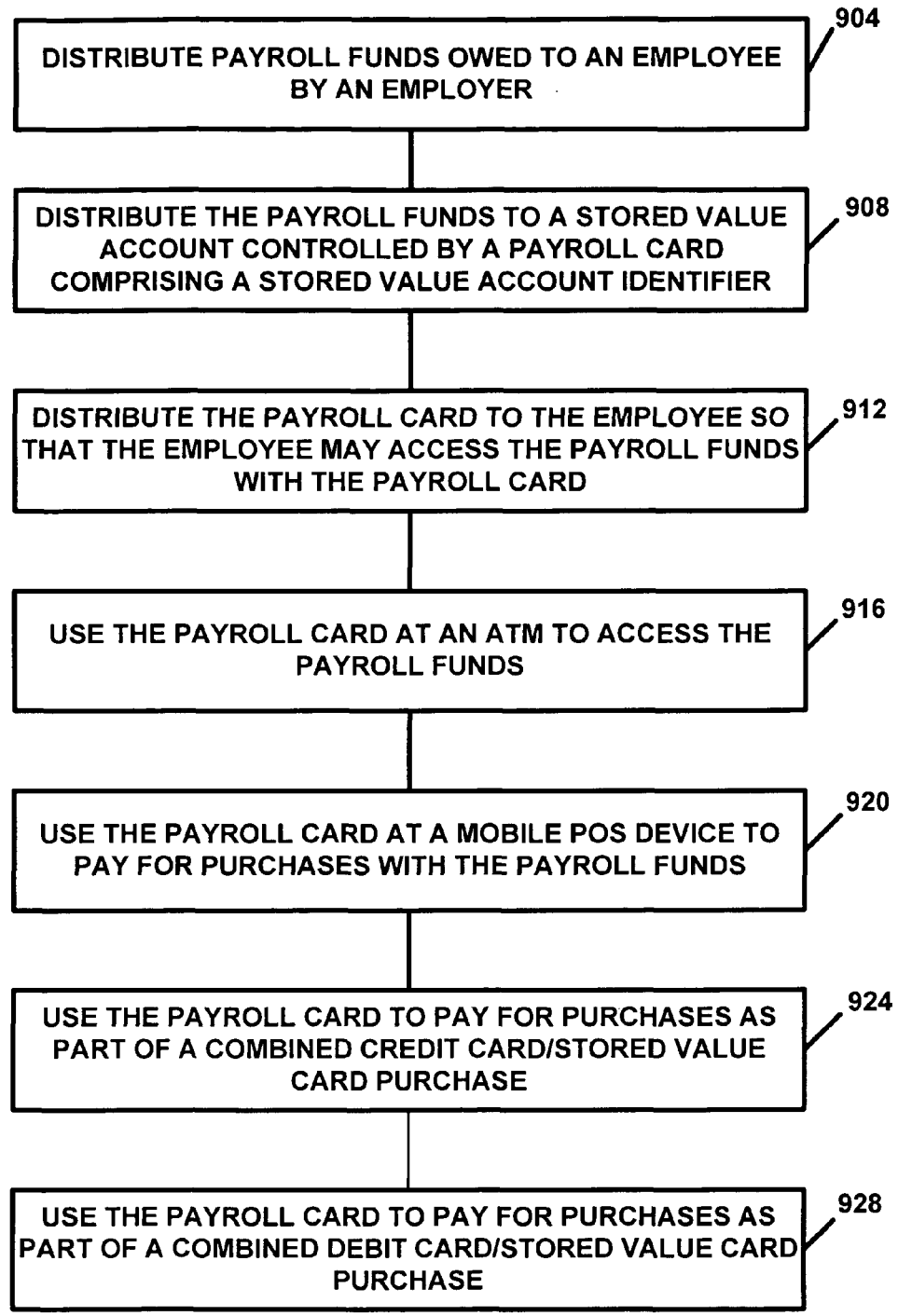
FIG. 9 is a flowchart illustrating a method of distributing payroll funds according to another embodiment of the invention.

FIG. 9 illustrates a more detailed example of the general system shown in FIG. 8. Namely, flowchart 900 illustrates a method of distributing payroll funds to an employee. In block 904, payroll funds owed to an employee by an employer are distributed. This can occur by the employer or a representative of the employer electronically transmitting the funds to a third-party account holder, such as a licensed money transmitter, such as Western Union. The licensed money transmitter can then hold the money in an account at the licensed money transmitter's location or home office. In block 908, the payroll funds can be distributed to a stored value account controlled by a payroll card, which comprises a stored value account's identifier. Thus, for example, Western Union could move the funds from its general account to an account specific to a stored value card. Such an account would be identified by the stored value account identifier, which was accessible from the stored value card. Thus, for example, stored value cards could be made up of a magnetic stripe card encoding a stored value account identifier. According to another example, the stored value card could be made up of a smart card, which contains an encrypted or unencrypted stored value account identifier.

In yet another alternative embodiment, one might choose to use a stored value card in which the funds are accessible from the smart card itself. In such a fashion, the total amount of funds could be stored on the smart card in a secure fashion and decremented from the existing balance each time funds are used with the card. For non-smart card configurations, it is envisioned that the stored value account number would typically be routed to a stored value account database where the balance of the stored value card could be checked prior to use of the funds from the stored value account. After the transaction, the balance could be decremented accordingly.

In block 912, the payroll card is distributed to the employee so that the employee may access the payroll funds with the payroll card. The distribution of the payroll card to the employee can be accomplished in a variety of ways. For example, the employer may choose to distribute payroll cards rather than distributing payroll checks to the employees. Thus, the distribution could be accomplished at the worksite. Alternatively, the payroll cards may simply be accessed at a facility away from the workplace. Thus, in the case of a Western Union facility, a worker could access the payroll card at the Western Union location by merely visiting the Western Union location and presenting identification. At that point, the payroll card could then be handed over to the employee for future use.

Once the payroll card is obtained and activated, it could be used at a variety of locations according to one embodiment of the invention. Block 916 shows that the payroll card could be used at an ATM to access payroll funds. Thus, a stored value card could be used at an ATM to identify a stored value account which could be accessed by the ATM network. This embodiment of the invention would facilitate the accessing of payroll funds at a variety of locations throughout a geographic region. Namely, ATM networks typically provide a great number of facilities for accessing cash, as opposed to traditional bank teller facilities. Thus, an individual who does not have a bank account with a traditional bank could readily access his or her payroll funds by merely presenting a payroll card at the ATM.

Similarly, in block 920, the payroll card could be used at a point-of-sale device (POS) to pay for purchases with the payroll finds. Again, in the embodiment of the invention in which the payroll card takes the form of a stored value card, the stored value card could be used at a POS device to complete the purchase.

The form of the payroll card can be accomplished in a variety of forms. As previously mentioned, the payroll card could take the form of a stored value card. Furthermore, the stored value card could take the form of either a card backing having a stored value account number or, alternatively, a smart card, which itself stores the stored value account number. Yet another embodiment of the invention would provide a hybrid card which includes a stored value portion and a traditional credit card portion. Thus, the same card could be used for accomplishing both credit card transactions and stored value transactions. In such a situation, the employee could present the hybrid credit/stored value card at a Western Union location and have the operator transfer the funds from the general account to the account identified by the stored value account. Similarly, according to block 928, a payroll card could be used for a purchase that is comprised of a credit or debit card portion, as well as a stored value card portion.

Figure 10:
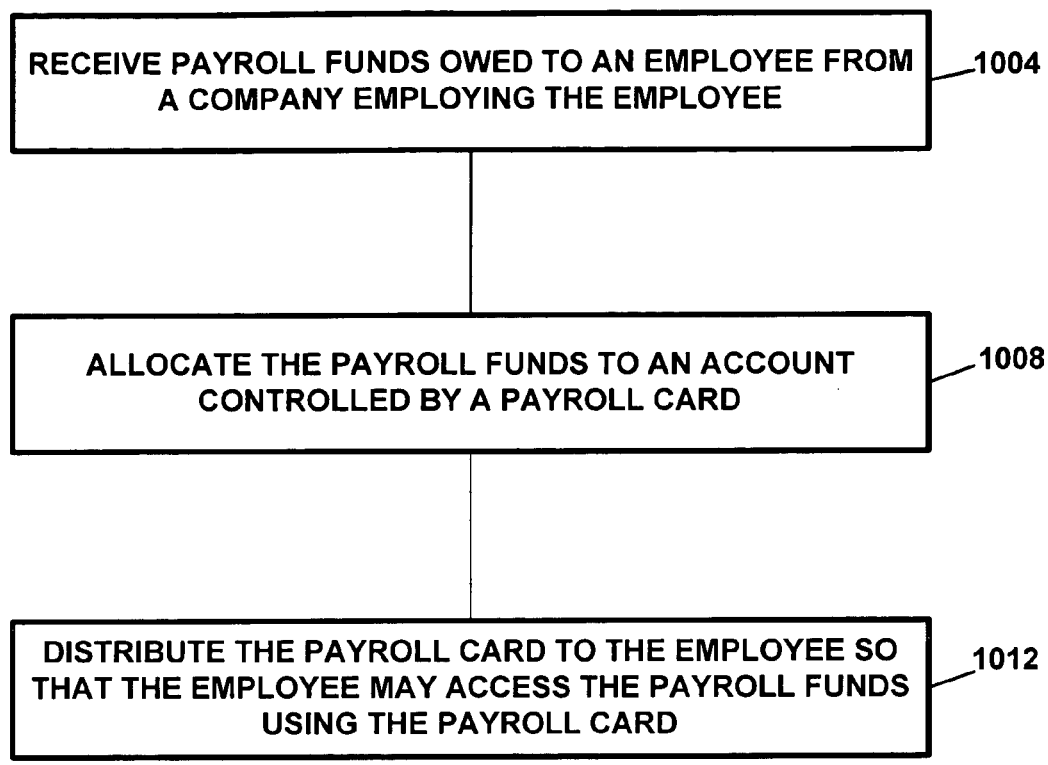
FIG. 10 is a flowchart illustrating a method of allocating payroll funds according to one embodiment of the invention.

Referring now to FIG. 10, a flowchart 1000 illustrates a method of allocating payroll funds from the perspective of an intermediary party. In block 1004, payroll finds are received that are owed to an employee by a company employing the employee. The payroll funds are allocated to an account controlled by a payroll card in block 1008. Furthermore, the payroll card is distributed to the employee so that the employee may access the payroll funds using the payroll card.

Figure 11:
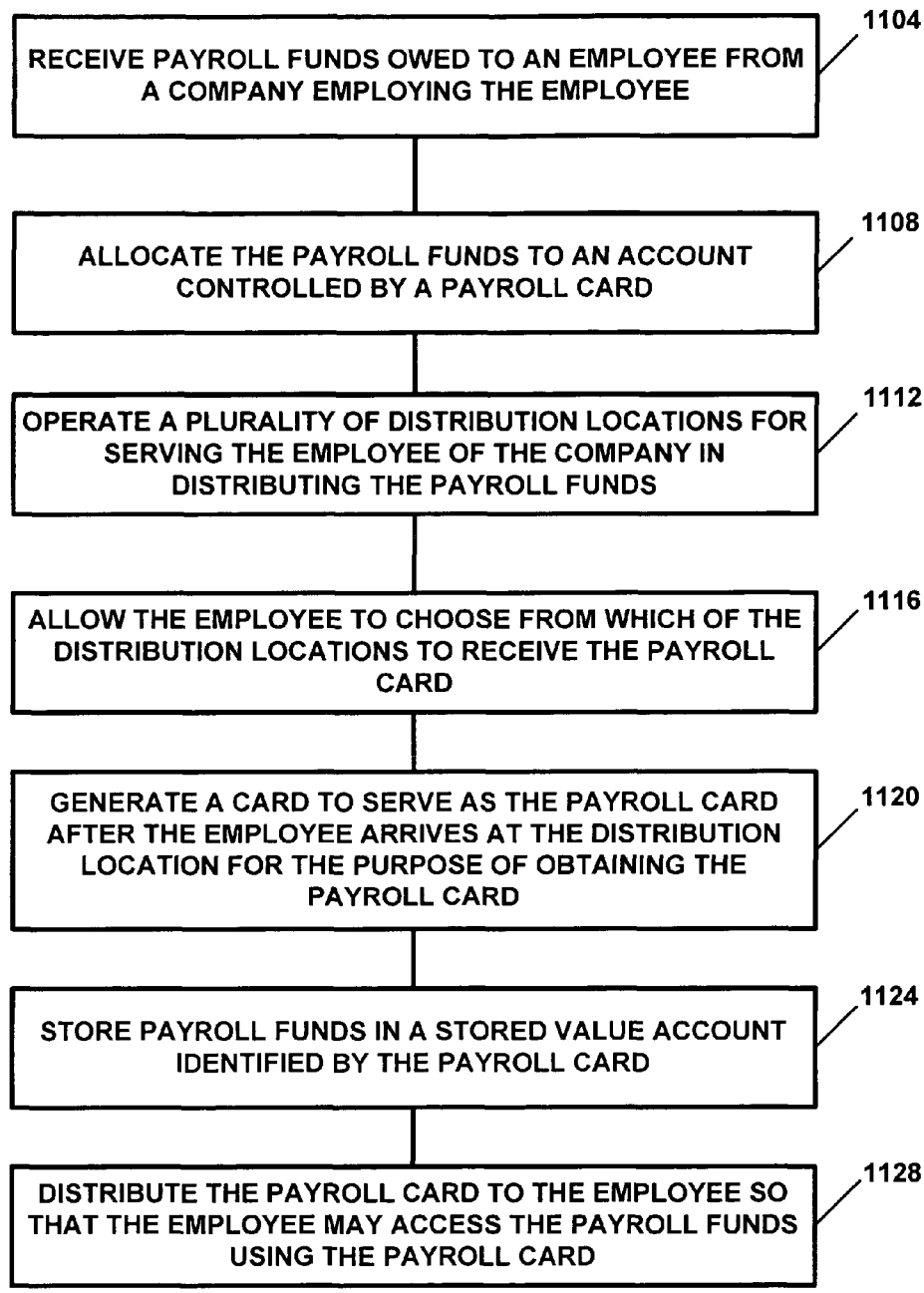
FIG. 11 is a flowchart illustrating a method of allocating funds according to another embodiment of the invention.

This embodiment of the invention is illustrated further in FIG. 11 by flowchart 1100. In block 1104 of FIG. 11, payroll funds are received that are owed to an employee by a company employing the employee. This could be accomplished by the employer transferring funds to the intermediary or by a representative of the employer transferring funds to the intermediary. The payroll funds are eventually allocated to an account controlled by a payroll card, as shown in block 1108. While the payroll funds are eventually allocated, they could be held for a period of time in a general account so as to accrue interest on the funds. Block 1112 illustrates that the intermediary can operate as several distribution locations for serving the employee of the company and distributing the payroll funds. For example, if a licensed money transmitter, such as Western Union, were to distribute payroll funds, a great deal of locations would be available to employees throughout a geographic region. This would allow access to the funds without requiring the employee to pay fees traditionally owed to a bank for the purpose of maintaining a bank account.

In block 1116, the employee is allowed to choose from which of the distribution locations to receive the payroll funds. Again, this can be accomplished by the employee visiting one of many licensed money transmitter locations or ATMs. In block 1120, a card is generated to serve as the payroll card after the employee arrives at the distribution location for the purpose of obtaining a payroll card. Thus, in this embodiment of the invention, the payroll card is generated at the distribution location. Thus, the employee is free to choose the location to visit for purposes of producing the payroll card. This provides a great deal of flexibility for the employee for purposes of distributing the payroll card and funds. At a Western Union location, for example, the operator could transfer funds to a stored value account and encode a magnetic strip card with the stored value account identifier. Alternatively, at an ATM, the ATM could similarly initiate transfer of funds to a stored value account and eject a corresponding stored value account card to the employee after the employee establishes sufficient identification with the ATM. The production of the card at the ATM could easily be accomplished by preloading precoded stored value cards at the ATM and then activating and transferring funds to a corresponding account when the employee initiates the activation. Alternatively, an ATM could be configured with the ability to encode a payroll card, such as encoding a magnetic strip of a magnetic strip card with the stored value account number.

In block 1124, the payroll funds are stored in the stored value accounts that is identified by a payroll card. Finally, in block 1128, the payroll card is distributed to the employee so that the employee may access the payroll funds using the payroll card. As discussed previously, this can occur by the operator at the licensed money transmitter distributing the payroll card or by an ATM producing an encoded card.

Figure 12:
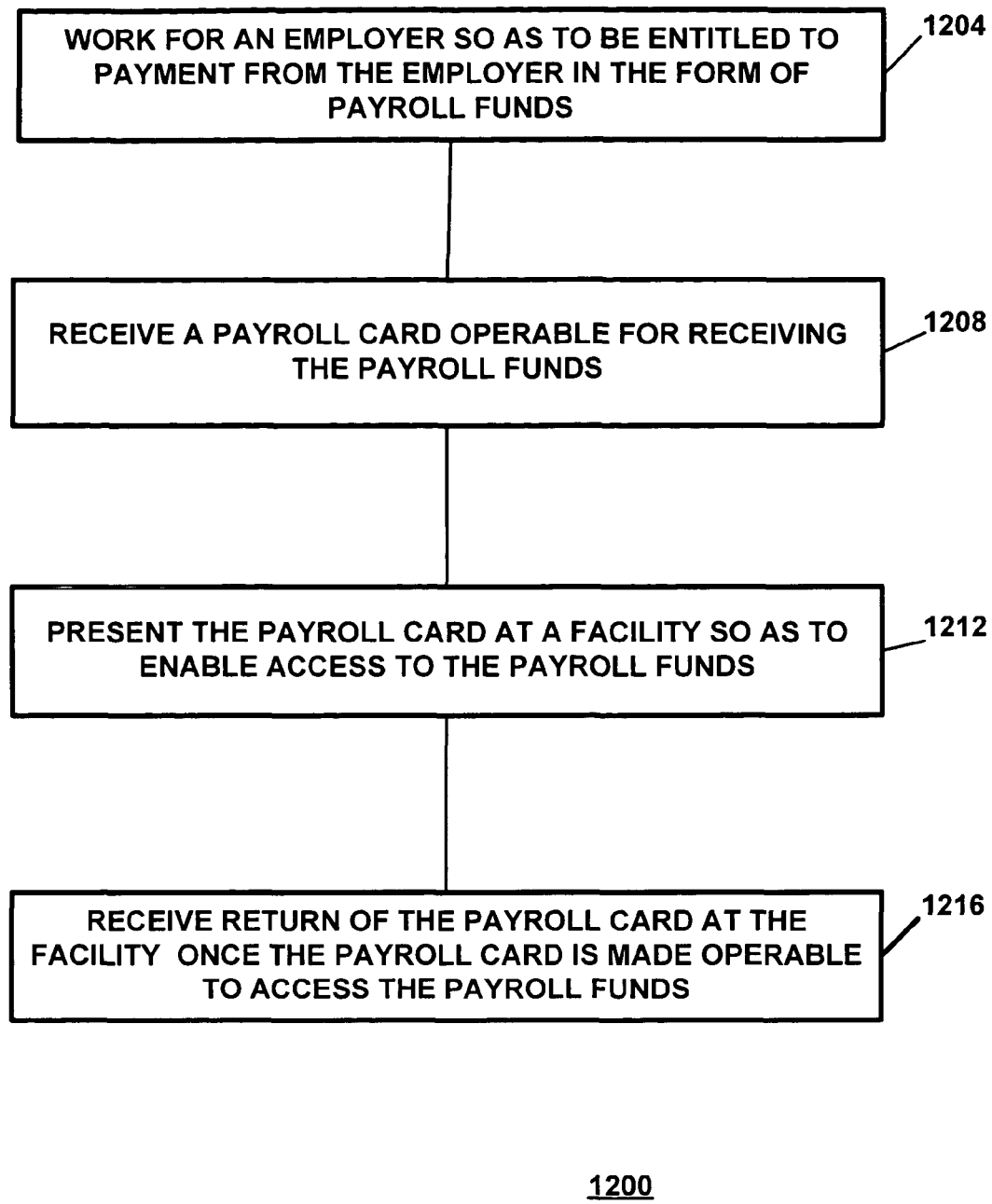
FIG. 12 is a flowchart illustrating a method of obtaining payroll funds according to one embodiment of the invention.

FIG. 12 illustrates a flowchart 1200 for receiving payroll funds from the perspective of the employee. In block 1204, an employee works for an employer so as to be entitled to payment from the employer in the form of payroll funds. In block 1208, a payroll card is received that is operable for receiving payroll funds. Thus, for example, the employer could distribute payroll cards to employees on a typical payday, along with a statement explaining the distribution of the payroll funds. The employee could then take the payroll card, which currently has an inactive account balance to a facility. The facility could be an ATM or a licensed money transmitter that is capable of activating the account for the payroll card, for example. Thus, according to block 1212, the payroll card is presented at a facility so as to enable access to the payroll funds. The operator at a licensed money transmitter, such as Western Union, could take the payroll card and identify the payroll funds. This might be accomplished merely from an identification number associated with the payroll card or by identification provided by the employee. Once the identification is established, however, then the payroll finds can be activated. This might occur by the funds being transferred from a general fund to a specific account for the payroll card, such as a stored value card. In block 1216, the payroll card is returned to the employee once it has been made active for accessing the payroll funds.

Figure 16:
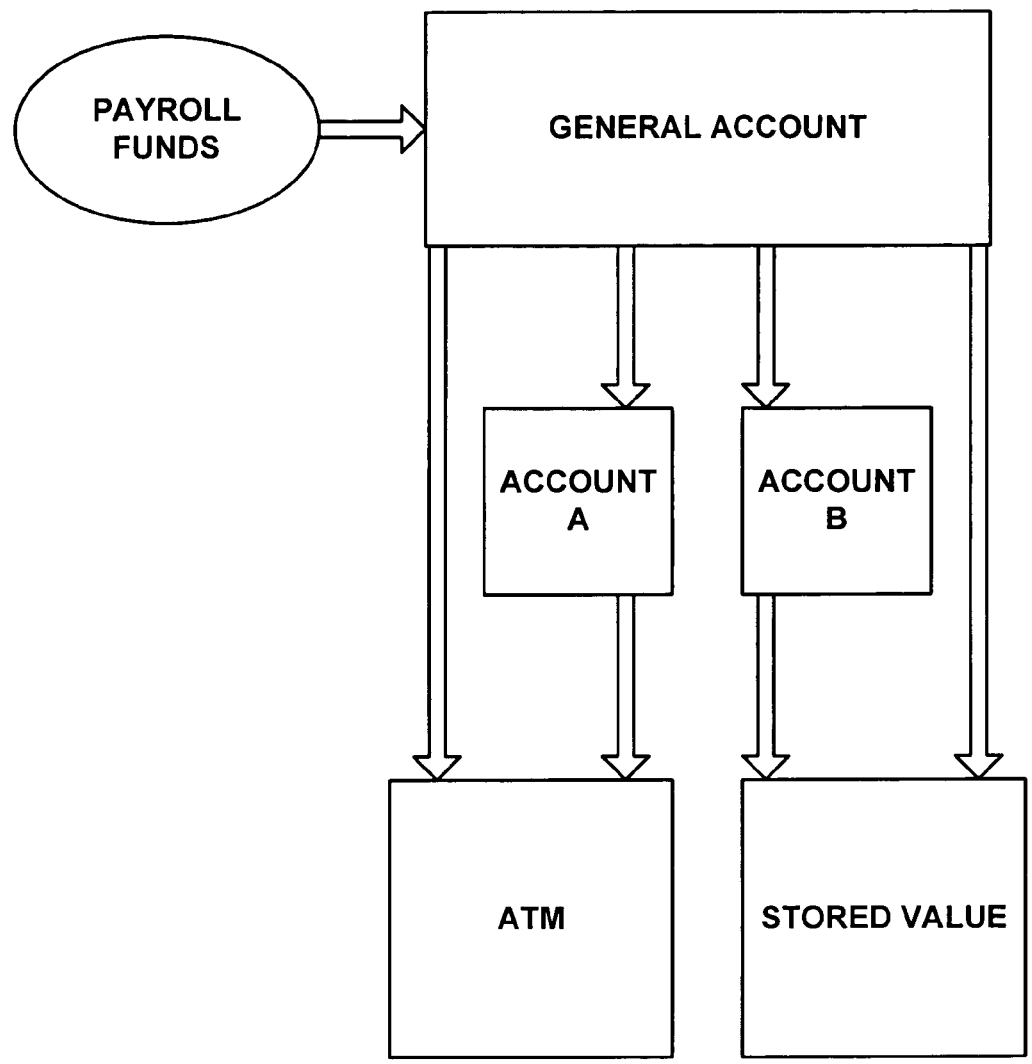
FIG. 16 is a flow diagram illustrating a system for distributing funds according to one embodiment of the invention.

FIG. 16 illustrates an embodiment of the invention for use with previously discussed FIGS. 8 through 12. In FIG. 16, payroll funds are shown transferred to a general account. The general account is capable of distributing funds via an ATM or stored value card account. Thus, the general account can transfer funds directly through an ATM or directly to a smart card stored value card, for example. Similarly, the general account can transfer funds to a specified account, such as accounts A and B. These accounts can then be accessed directly via either an ATM or a stored value account card.

Child Support Payments

Figure 14:
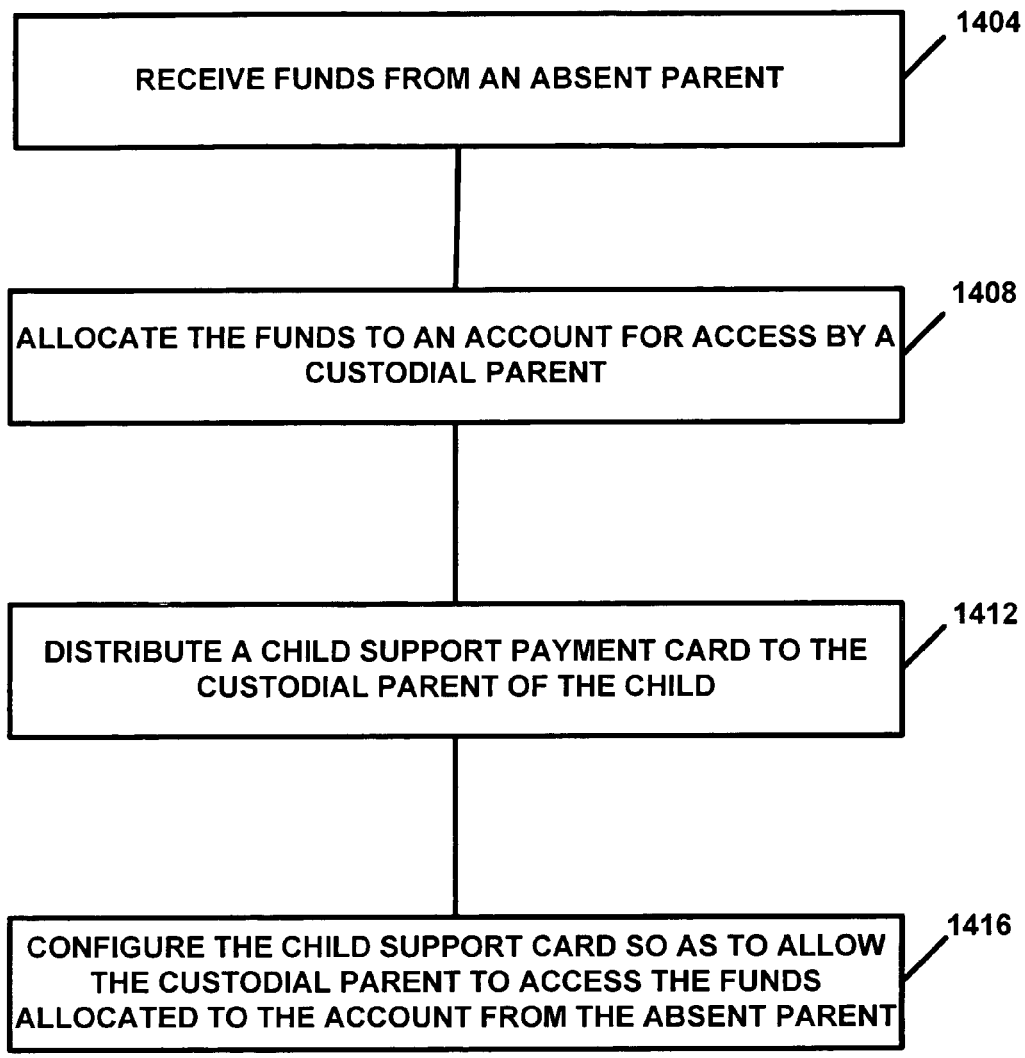
FIG. 14 is a flowchart illustrating a method of distributing custodial funds according to one embodiment of the invention.

According to yet another embodiment of the invention, a child support distribution system can be implemented. Referring now to FIG. 14, flowchart 1400 illustrates a method of distributing child support payments from an absent parent to a custodial parent. For purposes of this patent, it should be understood that the use of the term absent parent is intended to refer to the parent who is under an obligation to make payments to a custodial parent, such as for purposes of child support payments and the like. The term absent is not used to connote that the absent parent is never present. In some situations, the absent parent may be under an obligation to make child support payments to the custodial parent while at the same time sharing a significant amount of time with the child.

In flowchart 1400, block 1404 shows that funds are received from an absent parent. Block 1408 shows that the funds are then allocated to an account for access by the custodial parent. In block 1412, a child support payment is distributed to the custodial parent of the child. Furthermore, in block 1416, the child support card is configured so as to allow the custodial parent to access the funds allocated to the account from the absent parent.

Figure 15:
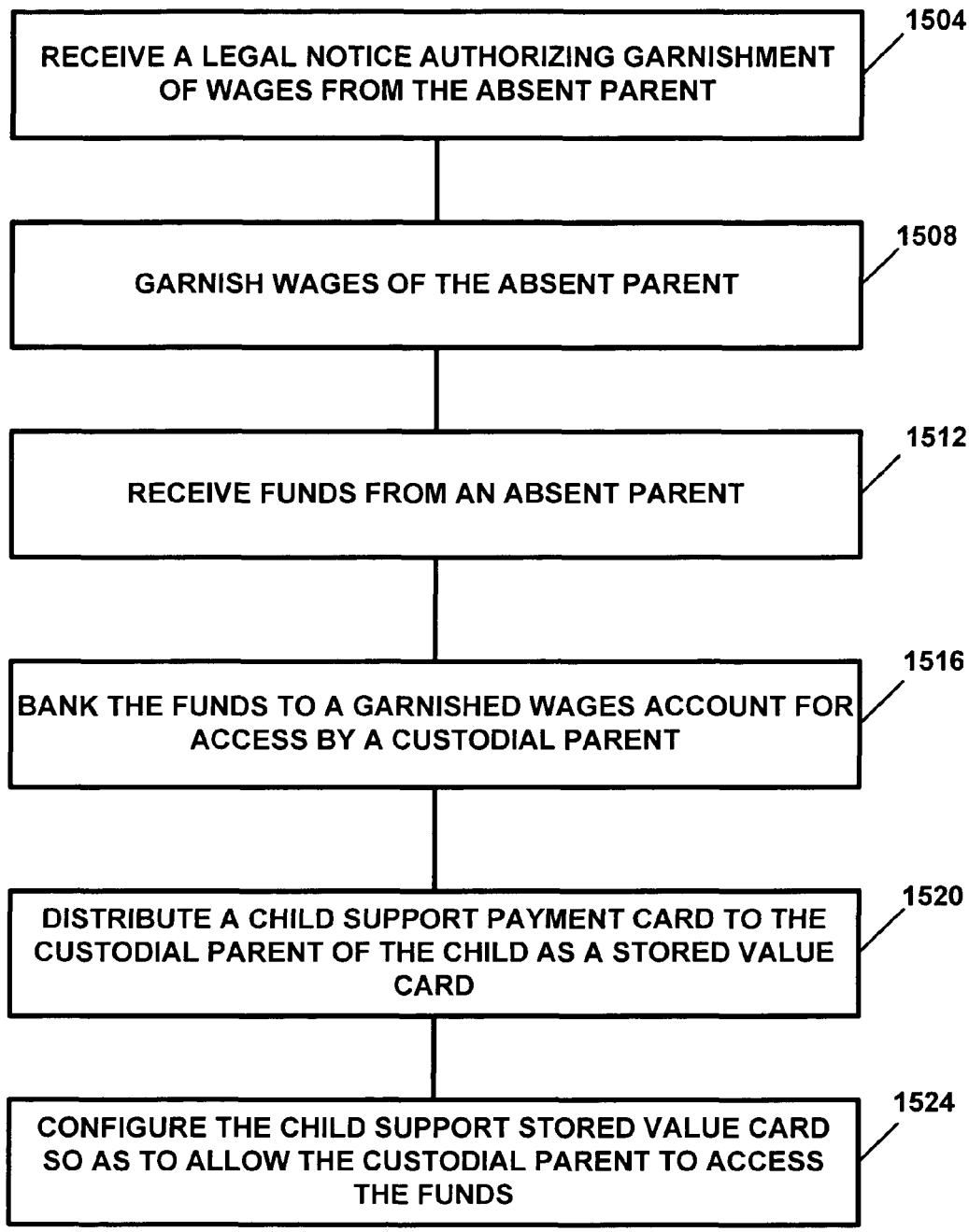
FIG. 15 is a flowchart illustrating a method of garnishing wages according to one embodiment of the invention.

FIG. 15 illustrates a more detailed system for distributing child support payments according to one embodiment of the invention. In block 1504 of FIG. 15, a legal notice is received authorizing garnishment of the wages from the pay of the absent parent. For example, when an absent parent fails to provide child support payments, a garnishment proceeding can be initiated in court so as to authorize the garnishment of wages. As a result of the garnishment proceeding, a legal notice such as a court order can be issued either directly to the custodial parent or to a collection agency. For example, a third-party intermediary could be issued a legal notice so as to give it authority to garnish wages from an individual's paycheck. Thus, the legal notice could subsequently be provided to the employer of the absent parent so that the paycheck funds are directed to the third party for garnishment of the wages. One way to accomplish this is to provide a direct deposit account in which the paycheck funds are deposited by the employer. These paycheck funds are swept to the third-party intermediary who can then garnish the wages of the absent parent as shown in block 1508. This could be accomplished by removing the amount of wages allowed by law from the paycheck and providing the remainder to the employee in the form of an electronic transfer to a bank account or by issuing a check to the absent parent. Thus, as shown in block 1512, funds are received from the absent parent. Funds could also be received directly from a cooperating absent parent whose wages have not been garnished and who is merely cooperating and providing funds to a third-party intermediary for distribution to a custodial parent. Thus, according to another embodiment of the invention, the absent parent could deposit funds directly with the intermediary rather than having his or her wages garnished.

In block 1516, the funds are transferred to a garnished wages account for access by a custodial parent. Thus, these funds could be stored in a common account or later accessed by the custodial parent or transferred to an individualized account, which would be accessed by the custodial parent. In block 1520, a child support payment card is distributed to the custodial parent of the child as a stored value card. The child support payment card could be provided by the court or other authority mailing the child support payment card to the custodial parent, or the custodial parent visiting one of the sites of the third-party intermediary. For example, Western Union could operate as a distributor of the child support payment cards when a custodial parent visits one of its sites and presents sufficient identification to entitle the custodial parent to receive the child support payment card.

Finally, in block 1524, the child support payment card can be configured as a stored value card so as to allow the custodial parent to access the funds. Thus, upon visiting a third-party intermediary, the custodial parent could have the funds transferred to the stored value account. Furthermore, the stored value card account could be used to pay for purchases as a stored value card. This allows the custodial parent to use the child support funds without requiring the custodial parent to have a traditional bank account. Thus, for the segment of the population that does not use bank accounts, this provides an opportune way for funds to be sufficiently distributed from an absent parent to a custodial parent who does not have a traditional bank account.

Figure 17:
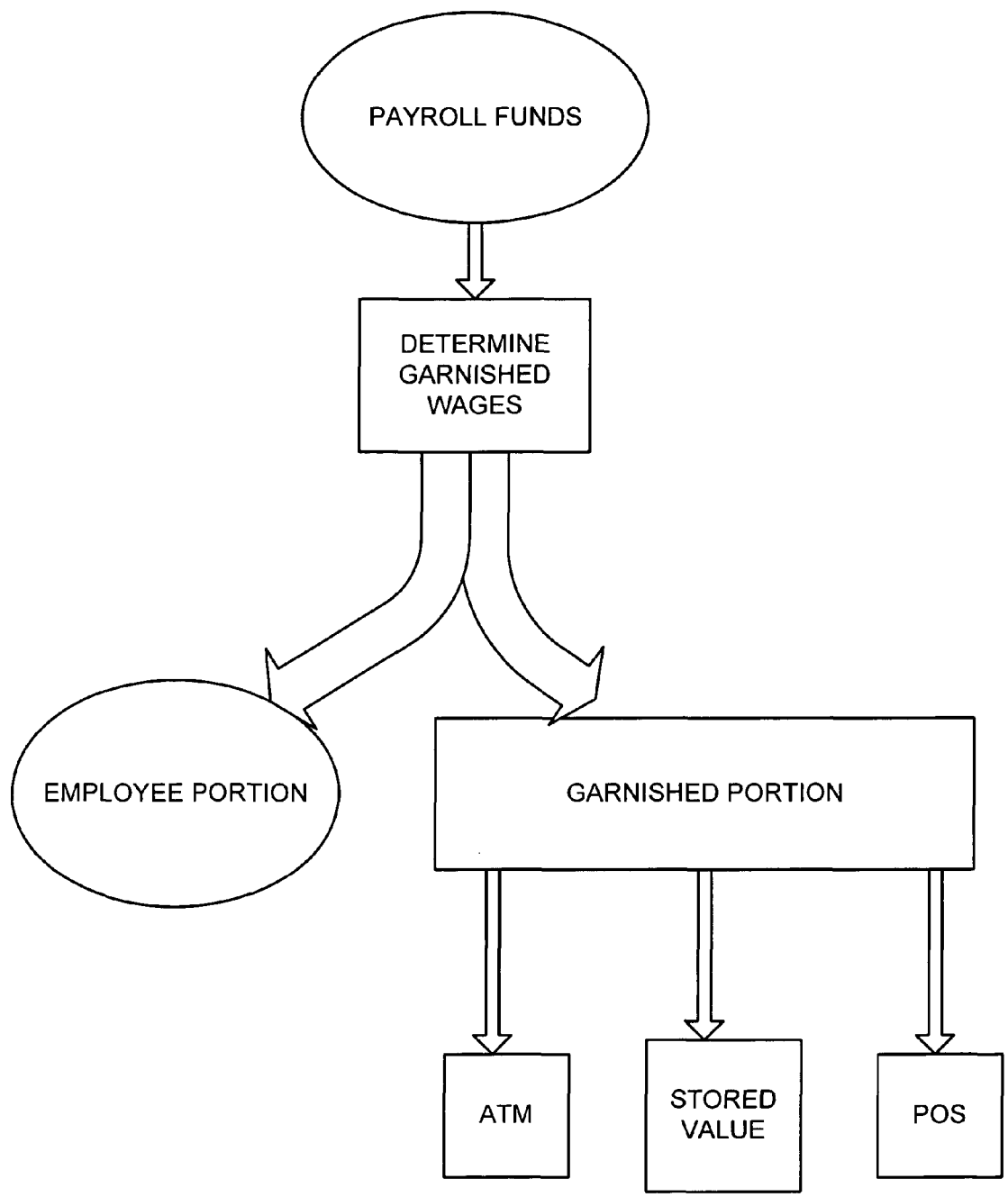
FIG. 17 is a flow diagram illustrating a system for garnishing wages according to one embodiment of the invention.

FIG. 17 illustrates a flow diagram illustrating one embodiment of the invention. According to FIG. 17, payroll funds are transferred to an account where garnished wages can be determined. The wages are then divided into an employee portion and a garnished portion. The employee portion can be distributed to the employee who is also the absent parent. Furthermore, the garnished portion can be distributed to an account. This account can be accessed by way of an ATM, a stored value card or a POS device for purposes of conveying the garnished portion to the receiver of funds. As explained herein, this can be accomplished by issuing a stored value card to the receiver of the garnished funds for use in accessing the garnished funds through an ATM, stored value account, or POS device.

While the above examples have highlighted payroll distribution and child support payments specifically, the system is generally applicable for use by people in other situations as well. For example, the system is particularly applicable for payment of contractors who are unbanked. Thus, a hiring party could provide payment via the system to a contractor by depositing money in an account operated by a third party, such as a licensed money transmitter. The contractor could then report to the licensed money transmitter to retrieve the funds. The funds could then be swept into an account that is accessible via a payment card. Furthermore, the licensed money transmitter could then hand over the payment card, such as a stored value card, to the contractor for accessing the paid funds.

As another example, the system could be used for payment of an allowance to an un-banked individual. For example, in a government sponsored system that issues an allowance to an adult, e.g., for the welfare of a child, the system could be used to allow the funds to be transferred to a stored value card on a weekly or periodic basis. Thus, the allowance issuer could distribute the funds to the allowance receiving party through this system. Such an allowance system would not be limited for allowances issued to an adult. In fact, it could also be used for allowances issued from a parent to a child. Thus, a child away at camp or college or on a summer trip, for example, could retrieve an allowance of funds as designated by the parent.

Furthermore, the system could be useful in distributing emergency funds to an individual. Thus, for example, a traveler who loses his or her credit cards while on a business trip could arrange to have his or her spouse use the system to designate finds for the traveler that are distributed to the traveler via a stored value card. Thus, the traveler would be able to visit a Western Union location, for example, and claim the stored value funds. This is but one example of how emergency funds could be distributed by an emergency finds provider to a receiver of emergency funds.

Generally, the system is applicable for providing payment of funds from a first party to a second party via an intermediate party. The payment of funds can be distributed on a stored value card from an ATM or licensed money transmitter, for example, as explained herein.

Interest Bearing Transfer System

Figure 13A:
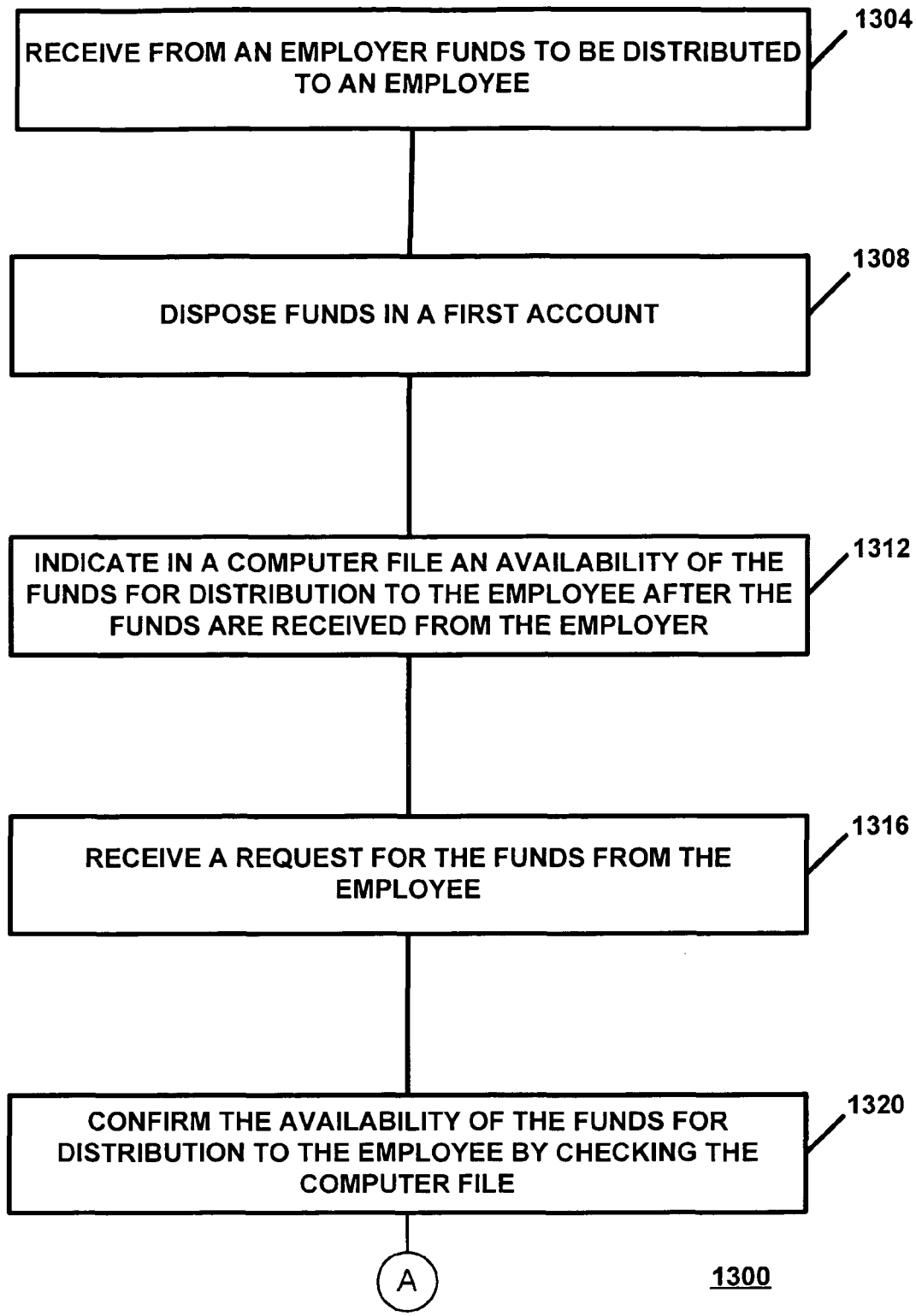
FIGS. 13a and 13b are flowcharts illustrating a method of distributing funds according to one embodiment of the invention.
Figure 13B:
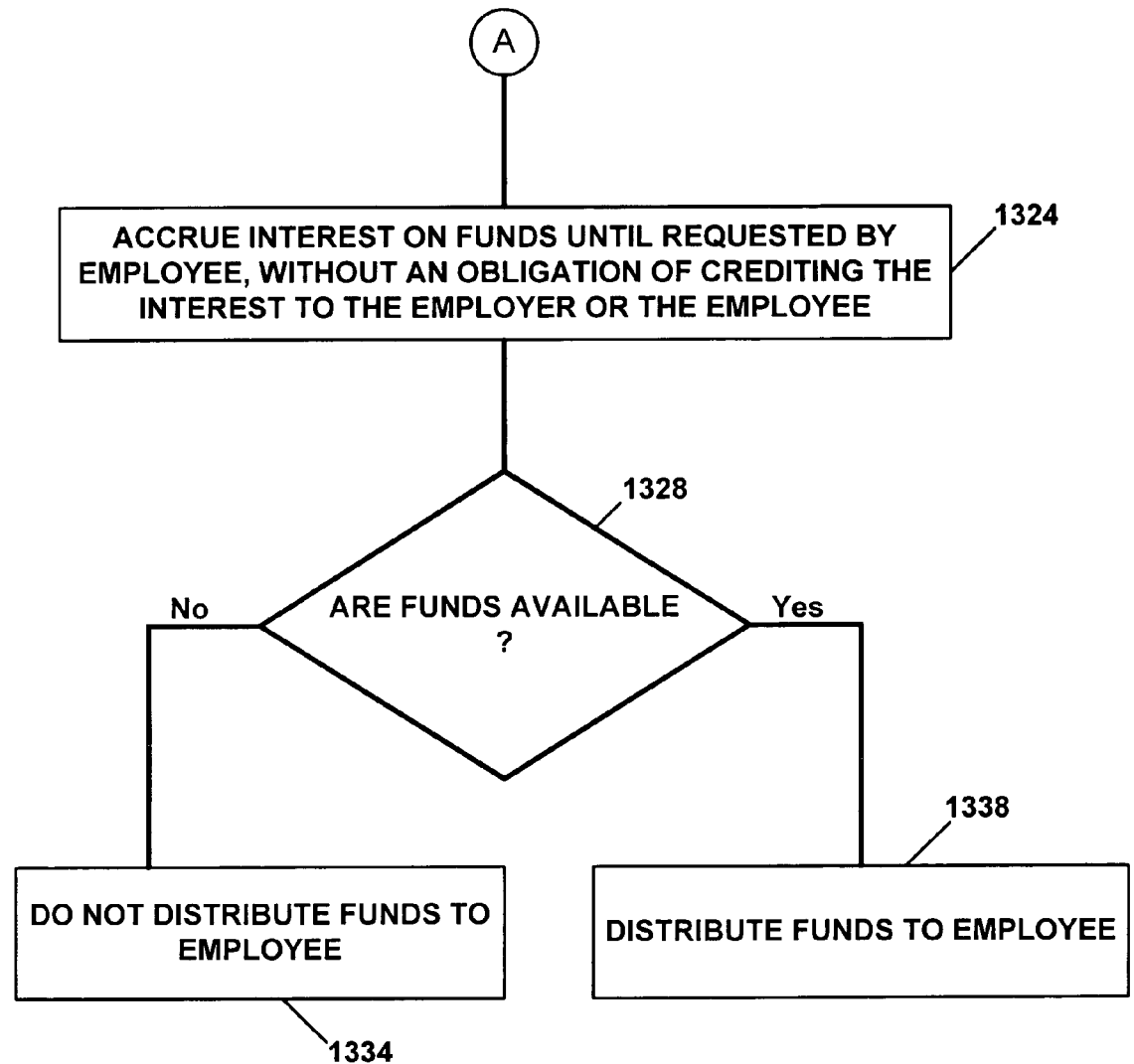

Referring now to FIGS. 13a and 13b, a flowchart 1300 illustrates a method of providing interest on transferred funds.

As described herein, funds can be deposited with a third-party intermediary, who then transfers the funds to the ultimate party for whom the funds were intended. According to this embodiment of the invention, the funds can be deposited in an interest-bearing account through which the intermediary can receive interest until the time that the funds are requested by the receiving party. Thus, for funds that are unclaimed for a period of time, the system allows the funds to be put to use for purposes of capitalizing projects, rather than not being put to use. Thus, in block 1304, funds are received from an employer to be distributed to an employee. The funds are disposed in a first account in block 1308. A computer file can be used to indicate the availability of the funds for distribution to the employee after the funds are received from the employer as shown in block 1312. Thus, in block 1316, a request for the funds from the employee can be received. For example, a licensed money transmitter, such as Western Union can act as an intermediary by operating an account in which an employer deposits funds for distribution to an employee. These funds can be held in the general account until the employee requests them. At the time of the request, the availability of the funds for distribution to the employee can be confirmed by checking the computer file as shown in block 1320. Up until the time that the funds are requested by the receiver-in this case the employee—and are available, interest can be accrued on the funds as shown in block 1324. This interest can be accrued without an obligation of crediting either the employer who deposited the funds or the employee who will be receiving the funds. Thus, in an expansive system, a significant amount of funds can be provided by the third-party intermediary to capitalize productive projects. Thus, investments in a variety of different projects can be achieved by allowing this money to be put to use. As a result, interest could be obtained on the deposited funds until the designated receiver of the funds claims them.

In block 1328, a check is made to determine whether the funds requested by the receiver, in this case the employee, are available. If the funds have not yet been deposited, then they will not be available. If the funds are not available, they are not distributed to the employee as shown in block 1334. However, if the funds are available, then they are distributed to the receiver as shown in block 1338. The funds can be distributed to the employee by transferring the funds from the general account or first account to a stored value card account or, in the case of a smart card stored value card, the actual smart card.

In the example where Western Union is a licensed money transmitter, the funds can be deposited by the employer to a Western Union account and then transferred by Western Union to a second account, which is designated as the employee's stored value account. This allows Western Union to receive interest on the funds until the time that they are claimed by the employee.

Furthermore, in the case of direct deposit accounts, the employer can deposit the funds in a direct deposit account of a bank or other financial institution before they are then swept to an account operated by a licensed money transmitter. The funds can be swept immediately from the direct deposit account to the account that the licensed money transmitter designates to allow the funds to accrue interest for the greatest amount of time. Once the intended receiver of the funds claims them, the funds can then be swept to a specific account for the receiver. Thus, an employee claiming funds at Western Union, for example, can receive a stored value card corresponding to stored value account to which the funds are transferred.

Furthermore, this interest-bearing system could be used for not only a payroll card system, but also a custodial parent system in which child support payments are deposited. Furthermore, alimony payments could also be transferred according to the embodiments described herein.

It should be understood that the use of the term payroll can include not only salary but also reimbursements for expenses, commissions, and other traditional payments made by employers to employees.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents, including the matter incorporated by reference.

It is thought that the apparatuses and methods of the embodiments of the present invention will be understood from this specification. While the above is a complete description of specific embodiments of the invention, the above description should not be taken as limiting the scope of the invention as defined by the claims.

What is claimed is:

1. A method of distributing funds from an absent parent of a child to a custodial parent of the child, said method comprising:
    maintaining a bank account at a banking institution into which funds from the absent parent are deposited;
    upon the deposit of funds in the bank account, immediately receiving the funds at a computer system of a licensed money transmitter, wherein the licensed money transmitter is not a bank;
    maintaining at the computer system a transaction account of the licensed money transmitter for access by the custodial parent, wherein the transaction account is not an FDIC insured account;
    allocating with the computer system at least a portion of the received funds to the transaction account for access by the custodial parent;
    distributing a child support payment card with the computer system to said custodial parent of said child, the card associated with the transaction account;
    configuring said child support card with the computer system so as to allow said custodial parent to access the allocated funds in the transaction account;
    providing access to the absent parent at the computer system of remaining funds transferred to the computer system and not allocated to the transaction account for the custodial parent; and
    accruing interest on said allocated funds with the computer system and for the benefit of the licensed owner transmitter, during the time period between when said funds are received from said absent parent and the time when said funds are accessed by said custodial parent, without an obligation of crediting the interest to either said absent parent or said custodial parent.

2. A method of distributing funds from an absent parent of a child to a custodial parent of the child, said method comprising:
    maintaining a bank account at a banking institution into which funds from the absent parent are deposited;
    upon the deposit of funds in the bank account, immediately crediting the funds at a computer system of a licensed money transmitter, wherein the licensed money transmitter is not a bank;
    maintaining at the computer system a transaction account for access by the custodial parent, wherein the transaction account is not an FDIC insured account;
    allocating with the computer system at least a portion of the credited funds to the transaction account for access by the custodial parent;
    distributing a child support payment card with the computer system to said custodial parent of said child, the card associated with the transaction account;
    configuring said child support card with the computer system so as to allow said custodial parent to access the allocated funds in the transaction account; and
    providing access to the absent parent at the computer system of remaining funds transferred to the computer system and not allocated to the transaction account for the custodial parenting.

3. The method as described in claim 2 and further comprising:
    receiving a legal document at the computer system from said custodial parent authorizing garnishment of wages from said absent parent;
    garnishing said wages of said absent parent with the computer system in accordance with terms of said legal document so as to obtain garnished wages; and
    banking said garnished wages with the computer system in the transaction account of the licensed money transmitter for access by the custodial parent as the allocated funds.

4. The method as described in claim 2 wherein said payment card is a stored value card.

5. The method as described in claim 2 wherein said payment card comprises an account identifier for use in authorizing access to said account.

6. The method as described in claim 2 wherein said payment card is operable to access said account using an automated teller machine.

7. A method of earning interest on deposited payroll funds, said method comprising:
    maintaining a bank account into which employer funds to be distributed to an employee are deposited;
    upon deposit of the employer funds at the bank account, immediately receiving at a computer system of a licensed money transmitter the employer funds;

disposing said funds with the computer system in a first account maintained by the licensed money transmitter, wherein the licensed money transmitter is not a bank and wherein the first account is not an FDIC insured account;

indicating in a computer file of the computer system an availability of said funds for distribution to said employee after said receiving said funds at the computer system;

receiving at the computer system a request for said funds from said employee;

confirming with the computer system said availability of said funds for distribution to said employee by checking said computer file;

if said funds are available, distributing with the computer system said funds to said employee; and accruing interest with the computer system on said funds during the time period between when said funds are received from said employer and said time when said funds are distributed to said employee without an obligation of crediting said interest to either said employer or said employee, so that said funds can be provided by the licensed money transmitter to capitalize productive projects.

8. The method as described in claim 7 wherein said distributing said funds to said employee comprises transferring said funds from said first account to a stored value card.

9. The method as described in claim 7 wherein said distributing said funds to said employee comprises transferring said funds from said first account to a second account wherein said second account is in the name of said employee.

10. The method as described in claim 7 wherein the employer funds are deposited in the bank account via a direct deposit ACH transaction and wherein the method further comprises:

transferring said funds from the first account to an account held in the name of said employee, after said employee requests said funds.

11. A method of earning interest on child support funds, said method comprising:

establishing an account at a bank into which funds, from an absent parent to a custodial parent, are deposited;

upon deposit of the funds in the bank account, immediately receiving at a computer system of a licensed money transmitter the funds, wherein the licensed money transmitter is not a bank;

disposing said funds with the computer system in a first account of the licensed money transmitter, wherein the account is not an FDIC insured demand deposit account;

indicating in a computer file of the computer system an availability of said funds for distribution to said custodial parent after said receiving said funds from said absent parent;

receiving at the computer system a request for said funds from said custodial parent;

confirming with the computer system said availability of said funds for distribution to said custodial parent by checking said computer file;

if said funds are available, distributing said funds with the computer system to said custodial parent; and accruing interest on said funds with the computer system during the time period from when said funds are received from said absent parent and said time when said funds are distributed to said custodial parent without the obligation of crediting said interest to either said absent parent or said custodial parent, so that said funds can be used by the licensed money transmitter to capitalize productive projects.

12. The method as described in claim 11 wherein said distributing said funds to said custodial parent comprises transferring said funds from said first account to a stored value card.

13. The method as described in claim 11 wherein said distributing said funds to said custodial parent comprises transferring said funds from said first account to a second account wherein said second account is in the name of said custodial parent.

14. The method as described in claim 11 wherein said funds are deposited in the bank account by direct deposit via an ACH transaction and further comprising:

transferring said funds from the first account to an account held in the name of said custodial parent, after said custodial parent requests said funds.

15. The method as described in claim 2 and further comprising:

receiving a legal document at the computer system from said custodial parent authorizing garnishment of wages from said absent parent;

garnishing said wages of said absent parent with the computer system in accordance with terms of said legal document, the garnished wages comprising the funds allocated to the transaction account.

16. The method of claim 2, further comprising:

accruing interest on the allocated funds with the computer system and for the benefit of the licensed owner transmitter, during the time period between when the deposited funds are received from said absent parent and the time when the allocated funds are accessed by said custodial parent, without an obligation of crediting the interest to either said absent parent or said custodial parent.

17. The method of claim 2, wherein the funds deposited into the bank account are a direct deposit via an ACH transaction.

18. The method of claim 2, wherein the absent parent is a first absent parent, and further comprising:

receiving at the computer system funds directly from a second absent parent, in addition to the funds deposited by the first absent parent at the banking institution and received at the computer system, and crediting the funds from the second absent parent to a second transaction account; and configuring a second child support card with the computer system so as to allow a second custodial parent to access the funds in the second transaction account.

* * * * *